(12) United States Patent
Okazawa et al.

(10) Patent No.: US 11,037,310 B2
(45) Date of Patent: Jun. 15, 2021

(54) IMAGE PROCESSING DEVICE, IMAGE PROCESSING METHOD, AND IMAGE PROCESSING PROGRAM

(71) Applicant: OLYMPUS CORPORATION, Hachioji (JP)

(72) Inventors: Atsuro Okazawa, Tokyo (JP); Kosuke Kajimura, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 41 days.

(21) Appl. No.: 16/693,336

(22) Filed: Nov. 24, 2019

(65) Prior Publication Data

US 2020/0098119 A1    Mar. 26, 2020

Related U.S. Application Data

(63) Continuation of application No. PCT/JP2018/018928, filed on May 16, 2018.

(30) Foreign Application Priority Data

May 29, 2017    (WO) .................. PCT/JP2017/019930

(51) Int. Cl.
*G06T 7/33* (2017.01)
*G06T 5/00* (2006.01)
(Continued)

(52) U.S. Cl.
CPC ................ *G06T 7/33* (2017.01); *G06T 5/002* (2013.01); *G06T 5/50* (2013.01); *H04N 5/23229* (2013.01);
(Continued)

(58) Field of Classification Search
CPC ................ G06T 7/30–38; G06T 5/002; G06T 2207/10016; G06T 2207/20182; G06T 2207/20221; H04N 5/23229
See application file for complete search history.

(56) References Cited

U.S. PATENT DOCUMENTS

| 2008/0037869 A1* | 2/2008 | Zhou ...................... G06T 7/155 382/173 |
| 2010/0225787 A1* | 9/2010 | Making ................ H04N 1/3876 348/239 |

(Continued)

FOREIGN PATENT DOCUMENTS

| JP | 2010021633 A | 1/2010 |
| JP | 2011022805 A | 2/2011 |

(Continued)

OTHER PUBLICATIONS

Written Opinion of the International Searching Authority issued in International Application No. PCT/JP2017/019930 dated Aug. 29, 2017.*

(Continued)

*Primary Examiner* — Sean T Motsinger
(74) *Attorney, Agent, or Firm* — Holtz, Holtz & Volek PC

(57) ABSTRACT

An image processing device includes circuitry configured to: calculate a displacement of each of a plurality of corresponding feature regions between a reference image and a base image; calculate, as a evaluation score, difference value between displacements of two feature regions adjacent to each other in at least one of the up/down direction, the left/right direction, and the oblique 45° direction; determine an abnormal region on the basis of the score; classify other feature regions excluding the abnormal feature region; calculate a projection conversion matrix by using the displacement of the other feature regions and the result of the classification; calculate a degree of alignment of each pixel (Continued)

of the reference image with respect to each pixel of the base image by using the matrix; and generate a combined image by combining the reference image converted based on the degree of alignment with the base image.

8 Claims, 13 Drawing Sheets

(51) Int. Cl.
*G06T 5/50* (2006.01)
*H04N 5/232* (2006.01)
(52) U.S. Cl.
CPC ............... *G06T 2207/10016* (2013.01); *G06T 2207/20182* (2013.01); *G06T 2207/20221* (2013.01)

(56) References Cited

U.S. PATENT DOCUMENTS

| | | | | |
|---|---|---|---|---|
| 2013/0135445 | A1* | 5/2013 | Dahi | H04N 13/128 348/47 |
| 2015/0319363 | A1* | 11/2015 | Furukawa | H04N 5/2628 348/239 |
| 2015/0379354 | A1* | 12/2015 | Zhou | G06T 7/246 382/103 |
| 2017/0243351 | A1* | 8/2017 | Li | G06T 3/0068 |
| 2019/0208122 | A1* | 7/2019 | Okazawa | G06T 7/30 |
| 2019/0370937 | A1* | 12/2019 | Tanimoto | H04N 5/23232 |
| 2020/0098119 | A1* | 3/2020 | Okazawa | G06T 5/50 |
| 2020/0265567 | A1* | 8/2020 | Hu | G06N 3/08 |
| 2020/0311949 | A1* | 10/2020 | Okazawa | G06T 7/246 |
| 2020/0410641 | A1* | 12/2020 | Hayami | H04N 7/18 |

FOREIGN PATENT DOCUMENTS

| | | |
|---|---|---|
| JP | 2014219764 A | 11/2014 |
| JP | 2015192199 A | 11/2015 |
| JP | 2016505181 A | 2/2016 |

OTHER PUBLICATIONS

International Search Report (ISR) dated Aug. 14, 2018 (and English translation thereof), issued in International Application No. PCT/JP2018/018928.
International Search Report (ISR) dated Aug. 29, 2017 (and English translation thereof), issued in International Application No. PCT/JP2017/019930.
Written Opinion of the International Searching Authority dated Aug. 14, 2018 issued in International Application No. PCT/JP2018/018928.
Written Opinion of the International Searching Authority dated Aug. 29, 2017 issued in International Application No. PCT/JP2017/019930.

* cited by examiner

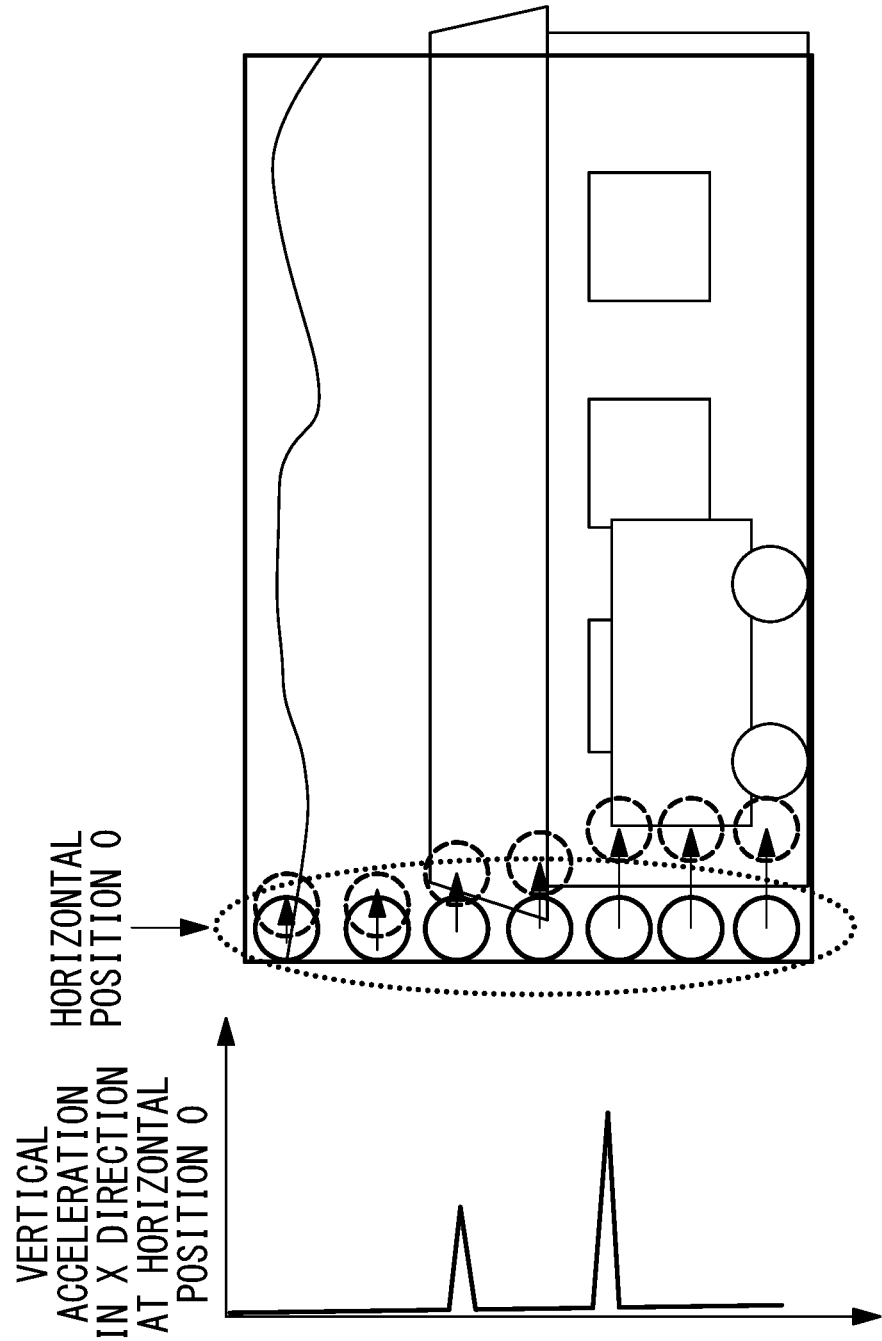

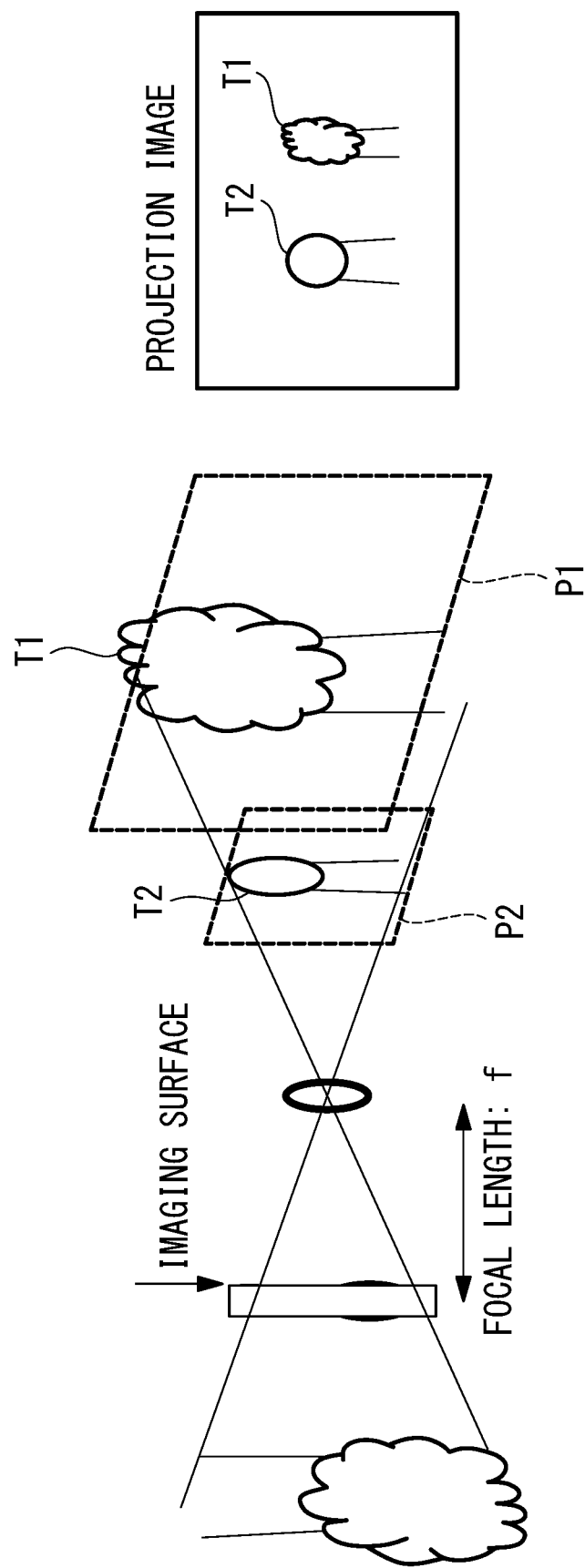

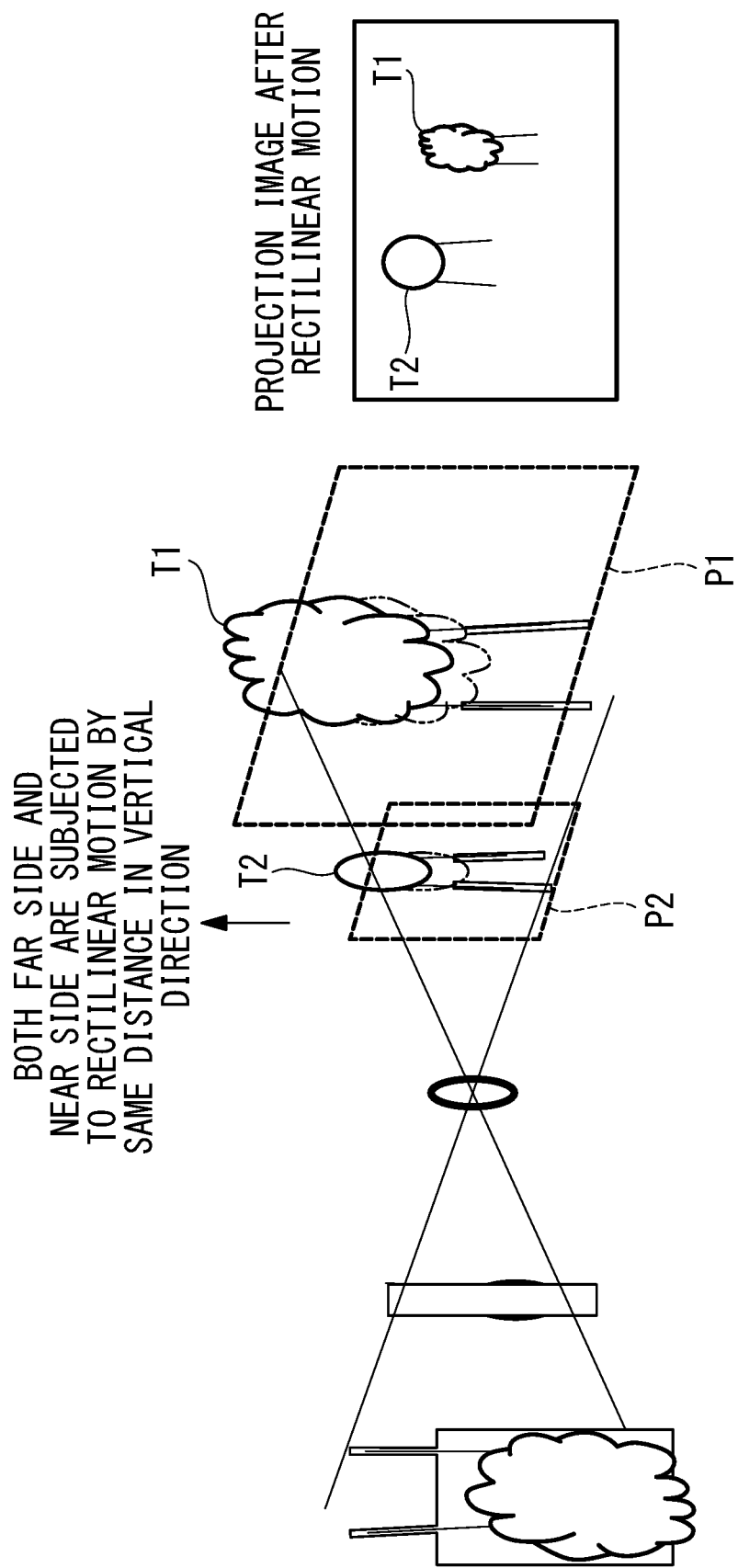

IMAGE PROCESSING DEVICE, IMAGE PROCESSING METHOD, AND IMAGE PROCESSING PROGRAM

CROSS-REFERENCE TO RELATED APPLICATIONS

This is a continuation of International Application PCT/JP2018/018928 which is hereby incorporated by reference herein in its entirety.

This application claims the benefit of International Application PCT/JP2017/019930, the content of which is incorporated herein by reference.

TECHNICAL FIELD

The present invention relates to an image processing device, an image processing method, and an image processing program for generating a combined image by combining a plurality of time-sequentially acquired images.

BACKGROUND ART

In one of the conventional techniques for aligning a plurality of images, the degree of misalignment of each pixel position has been modelled with a projection conversion matrix (for example, refer to PTL 1). This is a method for obtaining the degree of misalignment of each pixel position by acquiring, via the optical flow, feature point matching, or the like, the degrees of misalignment of characteristic regions in a base image and a reference image other than the base image that have been arbitrarily set from among a plurality of images and then by estimating a geometric change of the entire image from information about the degrees of misalignment.

When the degree of misalignment of each pixel position in an image is to be obtained by using a projection conversion matrix, it is possible to accurately calculate in which direction and how much the entire image shifts, as long as the image does not contain objects with depths. However, if the image contains objects with depths, such as an image in which a plurality of planes coexist, the degrees of misalignment differ among regions in different planes, making it necessary to take into account the degree of misalignment for each of the regions. If an appropriate degree of misalignment is not applied to each of the regions, alignment is not correctly performed, leading to an artifact (data error) occurring in a combined image.

PTL 1 discloses an image processing device for generating a combined image by solving such a problem. In order to suppress an artifact, the image processing device described in PTL 1 first obtains a plurality of projection conversion matrices representing the degrees of misalignment. Each of the projection conversion matrices indicates a projection conversion matrix that is optimal for one of the planes in subjects in which a plurality of planes coexist. By switching the projection conversion matrices from one to another, a plurality of images to which the degrees of misalignment have been applied (hereinafter, referred to as position-alignment images) are generated temporarily, and the difference values between these position-alignment images and the base image are obtained. An object region with depth can be appropriately detected by determining that a region having a large difference value is a region on an irrelevant plane having a different degree of misalignment.

In PTL 1, when a projection conversion matrix is to be obtained, first an initial set is produced from three or more randomly selected feature points. The size of the set is increased by generating a projection conversion matrix from the feature points contained in the initial set, searching for a feature point that matches conversion performed with that projection conversion matrix, and adding an applicable feature point to the set. When there are no more feature points to be added, this set is established as one set composed of feature points on the same plane. At the same time, the projection conversion matrix used to search for applicable feature points is set as a matrix representing a geometric change of that plane. If no feature points are added to the initial set, it is determined that the initial set is an improper set spanning a plurality of planes, and the initial set is re-produced. Once one set has been established, another initial set is produced by using other feature points not belonging to that established set, a search is made for feature points, and the feature points are added again. A set for each plane can be produced by repeating the above-described processing.

CITATION LIST

Patent Literature

{PTL 1}
Publication of Japanese Patent No. 5499261

SUMMARY OF INVENTION

One aspect of the present invention is an image processing device for generating a combined image by combining one base image and at least one reference image other than the base image that have been acquired time-sequentially, including: circuitry configured to: calculate a degree of alignment of each pixel of the reference image with respect to each pixel of the base image by using at least one projection conversion matrix; and generate the combined image by converting the reference image on the basis of the calculated degree of alignment and by combining the converted reference image with the base image, wherein in the calculating of the degree of alignment, the circuitry is configured to: calculate a displacement of each of a plurality of corresponding feature regions between the reference image and the base image; classify, as at least one set, other feature regions excluding, from the plurality of feature regions, an abnormal feature region having the displacement that shows a different tendency from the displacement of the other feature regions; and calculate the at least one projection conversion matrix by using the displacement of the other feature regions and the result of the classifying the other feature regions, wherein in the classifying the other feature regions, the circuitry is configured to: calculate an evaluation score of each of the plurality of feature regions by using the calculated displacement; and determine the abnormal region on the basis of the calculated evaluation score, and wherein in the calculating the evaluation score, the circuitry is configured to: calculate, as the evaluation score, the difference value between the displacements of two feature regions adjacent to each other in at least one of the up/down direction, the left/right direction, and the oblique 45° direction; and apply filter processing to the calculated evaluation score.

Another aspect of the present invention is an image processing method for generating a combined image by combining one base image and at least one reference image other than the base image that have been acquired time-sequentially, including: calculating a degree of alignment of each pixel of the reference image with respect to each pixel of the base image by using at least one projection conversion matrix; and generating the combined image by converting the reference image on the basis of the calculated degrees of alignment and by combining the converted reference image with the base image, wherein in the calculating of the degree of alignment: calculating a displacement of each of a plurality of corresponding feature regions between the reference image and the base image; classifying, as at least one set, other feature regions excluding, from the plurality of feature regions, an abnormal feature region having the displacement that shows a different tendency from the displacement of the other feature regions; and calculating the at least one projection conversion matrix by using the displacement of the other feature regions and the result of the classifying the other feature regions, wherein in the classifying the other feature regions: calculating an evaluation score of each of the plurality of feature regions by using the calculated displacement; and determining the abnormal region on the basis of the calculated evaluation score, and wherein in the calculating the evaluation score: calculating, as the evaluation score, the difference value between the displacements of two feature regions adjacent to each other in at least one of the up/down direction, the left/right direction, and the oblique 45° direction; and applying filter processing to the calculated evaluation score.

Another aspect of the present invention is a non-transitory computer-readable medium having an image processing program for causing a computer to execute processing for generating a combined image by combining one base image and at least one reference image other than the base image that have been acquired time-sequentially is stored thereon, the program causing the computer to execute functions of: calculating a degree of alignment of each pixel of the reference image with respect to each pixel of the base image by using at least one projection conversion matrix; and generating the combined image by converting the reference image on the basis of the calculated degrees of alignment and by combining the converted reference image with the base image, wherein in the calculating of the degree of alignment: calculating a displacement of each of a plurality of corresponding feature regions between the reference image and the base image; classifying, as at least one set, other feature regions excluding, from the plurality of feature regions, an abnormal feature region having the displacement that shows a different tendency from the displacement of the other feature regions; and calculating the at least one projection conversion matrix by using the displacement of the other feature regions and the result of the classifying the other feature regions, wherein in the classifying the other feature regions: calculating an evaluation score of each of the plurality of feature regions by using the calculated displacement; and determining the abnormal region on the basis of the calculated evaluation score, and wherein in the calculating the evaluation score: calculating, as the evaluation score, the difference value between the displacements of two feature regions adjacent to each other in at least one of the up/down direction, the left/right direction, and the oblique 45° direction; and applying filter processing to the calculated evaluation score.

BRIEF DESCRIPTION OF DRAWINGS

FIG. 7A is a diagram for illustrating a statistic in the vertical direction calculated from the image in FIG. 5B.

FIG. 8A is a diagram showing one example projection of an acquired image of two subjects having different depths.

FIG. 8B is a diagram showing one example projection of an image of the subjects in FIG. 8A in a case where a camera is subjected to rectilinear motion.

DESCRIPTION OF EMBODIMENTS

An image processing device, an image acquisition system, an image processing method, and an image processing program according to one embodiment of the present invention will now be described with reference to the drawings.

Figure 1:
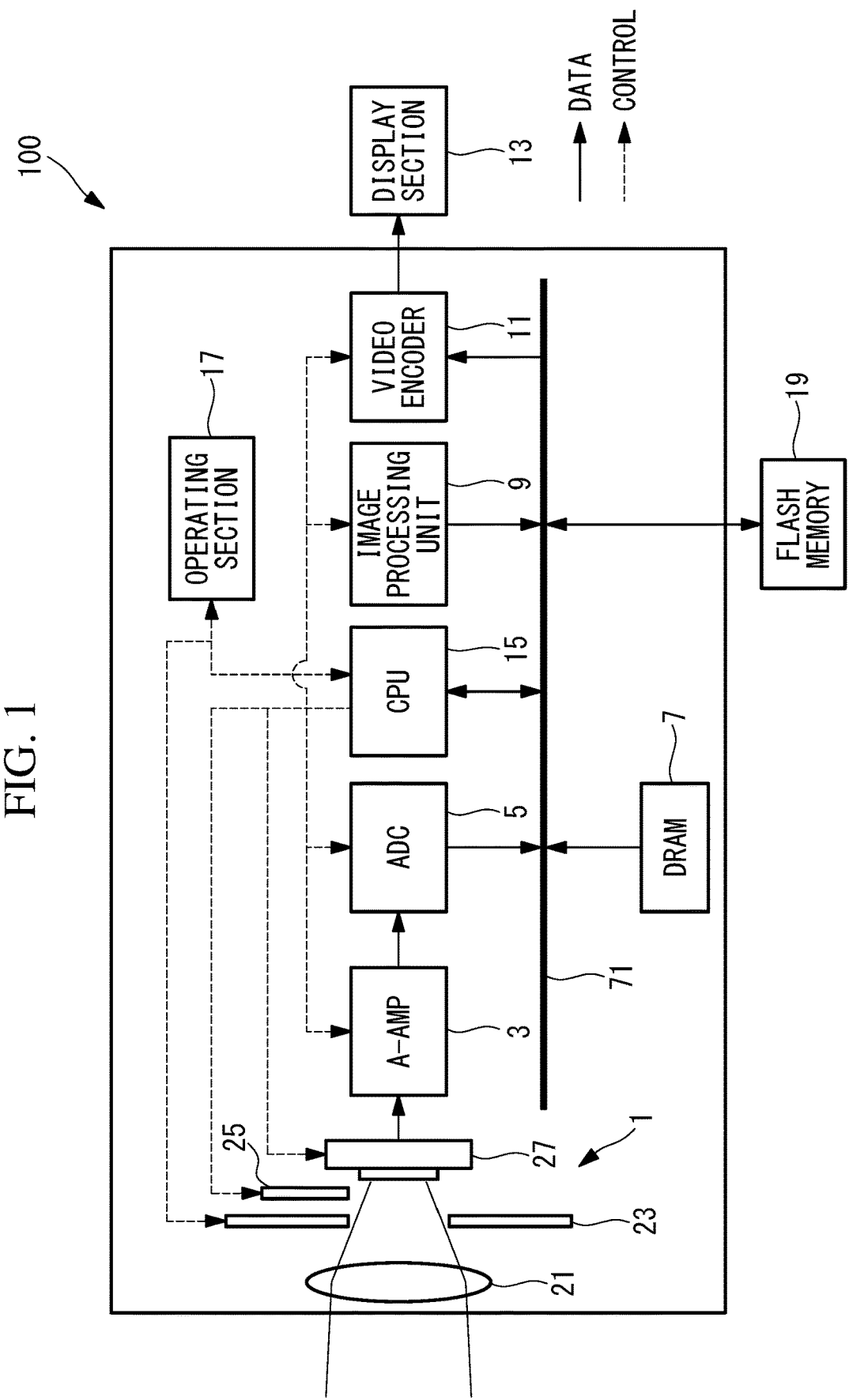
FIG. 1 is a block diagram schematically showing an example of the structure of an image processing device and an image acquisition system according to one embodiment of the present invention.

An image acquisition system 100 according to this embodiment is, for example, a digital camera. As shown in FIG. 1, this image acquisition system 100 includes: an image acquisition unit 1 for acquiring a plurality of images of a subject (not shown in the figure); an analog amplifier (A-AMP) 3; an analog-to-digital converter (ADC) 5; a dynamic random access memory (DRAM) 7; an image processing unit (image processing device) 9; a video encoder 11; a display section 13; a central processing unit (CPU) 15; an operating section 17; and a FLASH memory 19. In FIG. 1, the solid-line arrows indicate data flows, and the dashed-line arrows indicate control signal flows.

The image acquisition unit 1 includes: an image acquisition lens 21 for collecting light from the subject; an aperture stop 23 for restricting the amount of a light beam collected by the image acquisition lens 21; a mechanical shutter 25 capable of shutting off the light passing through the aperture stop 23; and an image acquisition element 27 for acquiring an image of the light that has passed through the mechanical shutter 25.

The image acquisition lens 21 is an optical system composed of one or more lenses for forming an image of the subject on the image acquisition element 27. The image acquisition lens 21 may be a fixed focal length lens or a zoom lens.

The aperture stop 23 is disposed on the optical axis of the image acquisition lens 21 and is configured so that the opening size thereof is variable.

The mechanical shutter 25 is disposed behind the aperture stop 23 and is configured to be openable/closable. The incident time for which a subject light beam from the subject is incident upon the image acquisition element 27 can be adjusted by adjusting the open time of the mechanical shutter 25. In other words, the mechanical shutter 25 is configured to be capable of adjusting the exposure time of the image acquisition element 27. As the mechanical shutter 25, a well-known focal-plane shutter, a well-known lens shutter, or the like can be employed.

The image acquisition element 27 is disposed at a position that is behind the mechanical shutter 25, that is on the optical axis of the image acquisition lens 21, and at which an image of the subject light beam is formed by the image acquisition lens 21. This image acquisition element 27 has a plurality of photodiodes (not shown in the figure) that are arrayed two-dimensionally and that constitute respective pixels.

The photodiodes constituting the image acquisition element 27 generate electric charge according to the amount of received light. The electric charge generated in the photodiodes is stored in a capacitor connected to each of the photodiodes. The electric charge stored in the capacitor is read out as an image signal according to a control signal from the CPU 15.

Color filters (not shown in the figure) in, for example, a Bayer array are disposed on the front faces of the photodiodes constituting the pixels. The Bayer array has, in the horizontal direction, lines in which R pixels and G (Gr) pixels are alternately arranged and lines in which G (Gb) pixels and B pixels are alternately arranged.

The A-AMP 3 adjusts the analog gain of an image signal sent from the image acquisition element 27.

The ADC 5 converts the image signal that has been subjected to analog gain adjustment by the A-AMP 3 into an image signal (pixel data) in a digital format. Hereinafter, in the present description, a group of multiple pieces of pixel data are denoted as imaging data. In addition, a value related to each pixel indicated by pixel data is denoted as a pixel value. Imaging data generated by the ADC 5 is written into the DRAM 7.

The DRAM 7 is an electrically rewritable memory and can temporarily store various types of data, such as imaging data (pixel data), recording image data, display image data, and processing data in the CPU 15. For the purpose of temporary storage, a synchronous dynamic random access memory (SDRAM), instead of the DRAM 7, may be used.

The image processing unit 9 is configured by, for example, an application specific integrated circuit (ASIC). The image processing unit 9 reads out image data from the DRAM 7, performs image processing, and writes the image data back to the DRAM 7 as display image data and recording image data. For example, when a static image is to be recorded, the image processing unit 9 generates static image data by performing image processing for recording a static image and, when a dynamic image is to be recorded, the image processing unit 9 generates dynamic image data by performing image processing for recording a dynamic image. Furthermore, at the time of live view display, the image processing unit 9 generates display image data by applying image processing for display to the image data read out from the DRAM 7.

The image processing in the image processing unit 9 will be described later in detail.

The video encoder 11 reads out display image data that has been generated by the image processing unit 9 and that has been temporarily stored in the DRAM 7 and outputs the read-out display image data to the display section 13.

The display section 13 is, for example, a liquid crystal display (LCD) or an organic EL display and is disposed on, for example, the back face of the digital camera. The display section 13 displays an image according to the display image data sent from the video encoder 11. The display section 13 can also be used for live view display, display of recorded images, etc.

The CPU 15 issues control signals to control the image acquisition element 27, control the opening size of the aperture stop 23, control the opening and closing of the mechanical shutter 25, drive the image processing unit 9, drive the video encoder 11, and control the entire image acquisition system 100. In addition, the CPU 15 determines whether an image acquired by the image acquisition element 27 is a base image or a reference image.

The operating section 17 includes various types of operating buttons, such as a power button, a release button, a playback button, and a menu button, and various types of operating members such as a touch panel. A user's instruction that has been input by the operating section 17 is recognized through processing performed by the CPU 15.

The FLASH memory 19 is incorporated in the image acquisition system 100 serving as the digital camera or is configured so as to be capable of being inserted into the image acquisition system 100 and can record recording image data as an image file in a predetermined format.

In FIG. 1, reference sign 71 denotes a bus. The bus 71 is connected to the ADC 5, the DRAM 7, the CPU 15, the image processing unit 9, the FLASH memory 19, and the video encoder 11. Various types of data generated in each of these sections 5, 7, 9, 11, 15, and 19 are transferred via the bus 71.

Next, the image processing unit 9 will be described.

Figure 2:
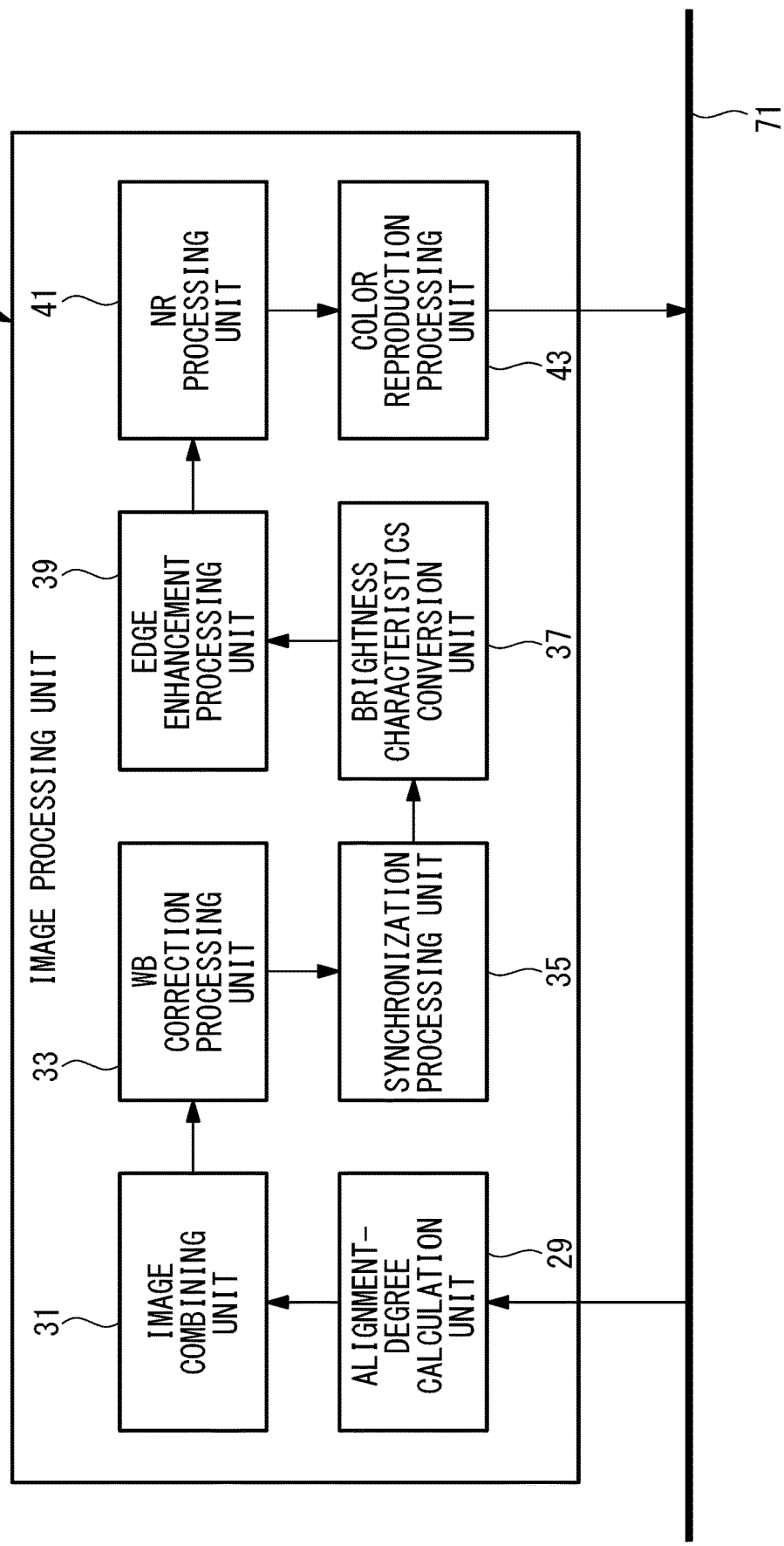
FIG. 2 is a block diagram schematically showing an example of the structure of an image processing unit in FIG. 1.

As shown in FIG. 2, the image processing unit 9 includes: an alignment-degree calculation unit 29; an image combining unit 31; a white balance (WB) correction processing unit 33; a synchronization processing unit 35; a brightness characteristics conversion unit 37; an edge enhancement processing unit 39; a noise reduction (NR) processing unit 41; and a color reproduction processing unit 43.

The various types of component units constituting the image processing unit 9 are not limited to the above-described component units but include other component units. Other component units in the image processing unit 9 include, for example, a compression/decompression processing unit etc. However, component units other than the above-described component units are not related directly to the present invention, and diagrammatic representations and explanations thereof will be omitted.

Figure 3:
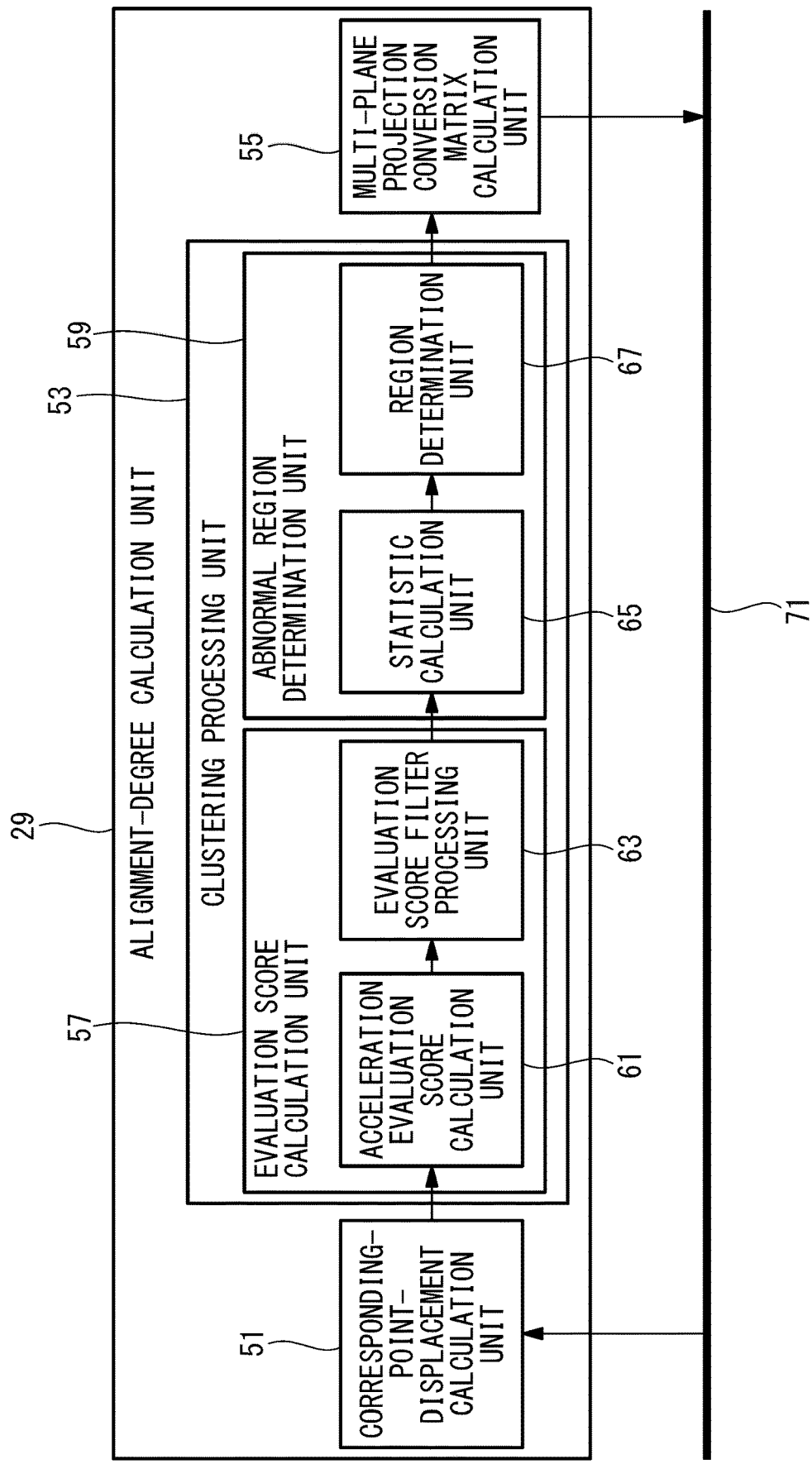
FIG. 3 is a block diagram schematically showing an example of the structure of an alignment-degree calculation unit in FIG. 2.

The alignment-degree calculation unit 29 reads, from the DRAM 7, the base image, serving as a base, and at least one reference image other than the base image among a plurality of images acquired by the image acquisition unit 1 and calculates the degree of misalignment (displacement) of each pixel in the reference image with respect to each pixel in the read-out base image. More specifically, as shown in FIG. 3, the alignment-degree calculation unit 29 includes: a corresponding-point-displacement calculation unit (corresponding-region-displacement calculation unit) 51; a clustering processing unit 53; and a multi-plane projection conversion matrix calculation unit (projection conversion matrix calculation unit) 55.

The corresponding-point-displacement calculation unit 51 obtains, from the base image and the reference image that have been arbitrarily set from among the plurality of images, the degrees of misalignment (displacement) of feature points (feature regions), serving as characteristic regions, in the images by means of the optical flow, feature point matching, or the like. Therefore, the feature points have coarse resolution, compared with the base image and the reference images.

The clustering processing unit 53 analyzes the tendency of the degrees of misalignment of the feature points output from the corresponding-point-displacement calculation unit 51, and detects, as an abnormal region, a feature point having a degree of misalignment that differs from the tendency of the degrees of misalignment of the other feature points. Before processing performed by the clustering processing unit 53 is described, the purpose of processing performed by the clustering processing unit 53 will be described with reference to FIGS. 4A to 5B.

Figure 4A:
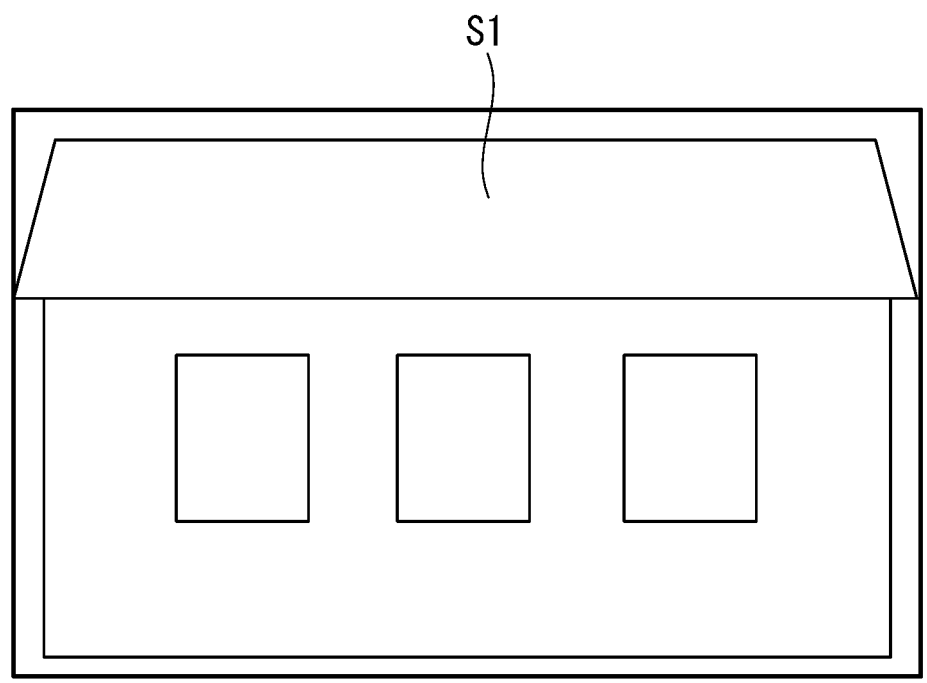
FIG. 4A is a diagram showing one example of an acquired image of one subject, illustrating displacements of feature points in a case where the image contains only one plane.
Figure 4B:
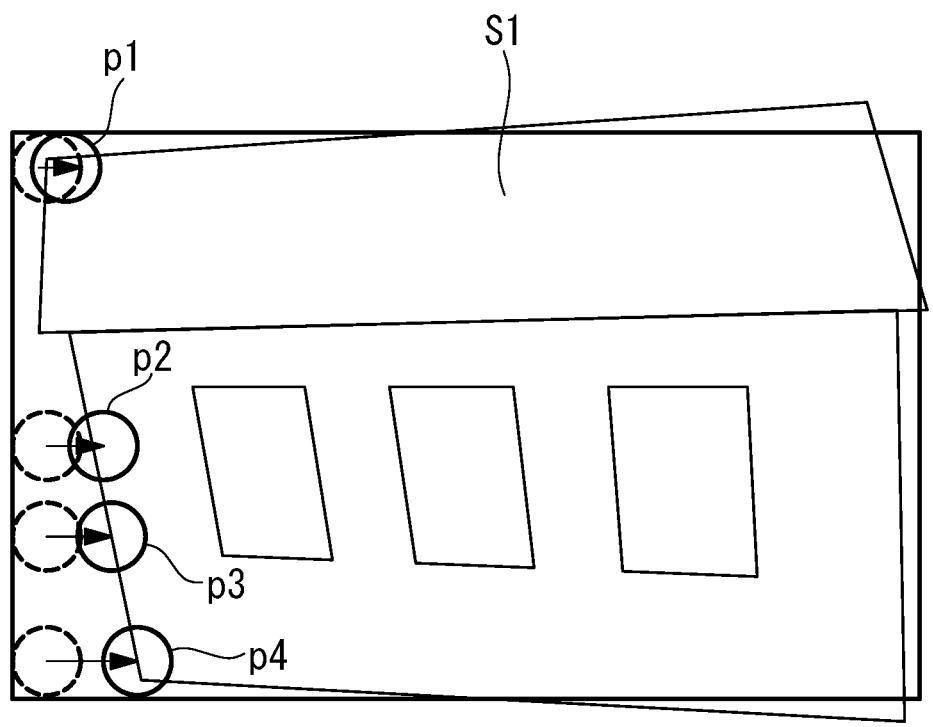
FIG. 4B is a diagram showing one example of the image in FIG. 4A in a case where a camera is subjected to motion.

Processing performed by the clustering processing unit 53 is intended particularly to remove a disturbance, which would be erroneously recognized as camera motion. FIG. 4A shows an image of a subject S1 having only one plane, and FIG. 4B shows an image in which the subject S1 in FIG. 4A is deformed as a result of the camera being subjected to motion with six degrees of freedom. In the example in FIG. 4B, a feature point p1 in the upper part of the image shows a low degree of misalignment, feature points p2 and p3 in the middle part of the image show a slightly higher degree of misalignment than in the upper part of the image, and a feature point p4 in the lower part of the image shows an even higher degree of misalignment than in the upper part of the image.

Figure 5A:
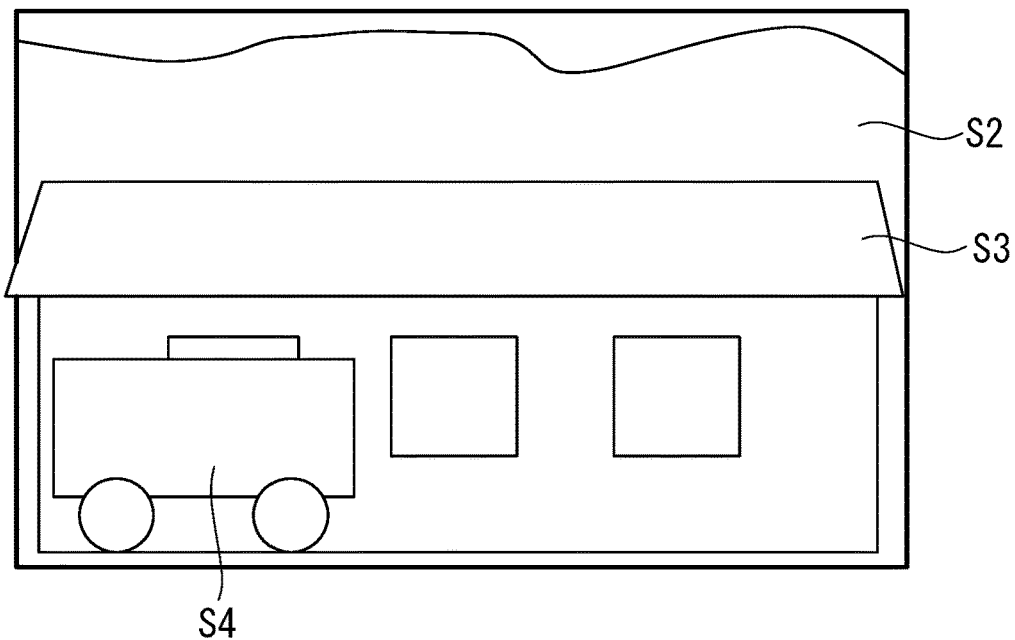
FIG. 5A is a diagram showing one example of an acquired image of two subjects having different depths and a moving object, illustrating displacements of feature points in a case where the image contains two planes and a disturbance.
Figure 5B:
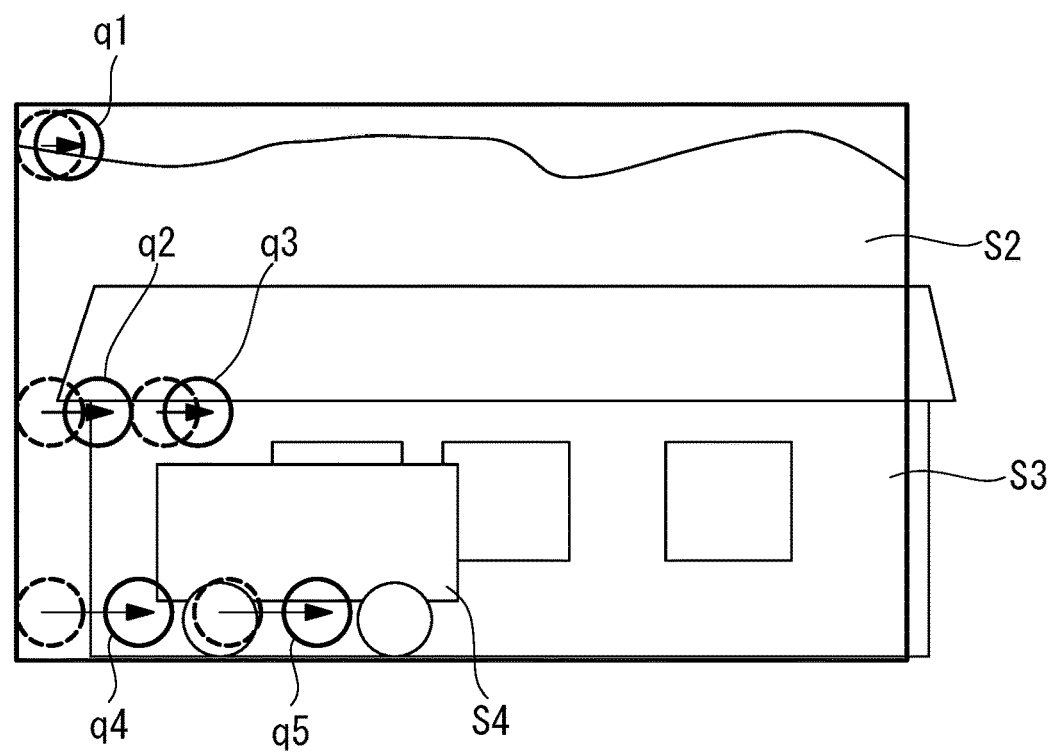
FIG. 5B is a diagram showing one example of the image in FIG. 5A in a case where a camera is subjected to motion.

On the other hand, FIG. 5A shows an image including a subject S2 at a long distance, a subject S3 at a middle distance, and a moving object S4 that moves relative to the subjects S2 and S3, which are stationary. This image includes two planes on which the subjects S2 and S3 are present and one disturbance formed of the moving object S4. FIG. 5B shows an image in which the subjects S2 and S3 in FIG. 5A have shifted to the right of the image and the moving object S4 has greatly moved to the right of the image as a result of the camera being subjected to only rectilinear motion towards the left of the image.

In the example in FIG. 5B, a feature point q1 corresponding to the subject S2 at a long distance in the upper part of the image shows a low degree of misalignment, feature points q2 and q3 corresponding to the subject S3 at a middle distance in the middle part of the image show a slightly higher degree of misalignment than in the upper part of the image. In the lower part of the image in which the subject S3 at a middle distance and the moving object S4 are present, feature points q4 and q5 in the region of the moving object S4 show a higher degree of misalignment than in the upper part and in the middle part of the image.

Here, in the subject S1 in FIG. 4B, if a camera motion can be correctly estimated by obtaining a projection conversion matrix from an initial set composed of the feature points p1, p2, and p3 in the upper part and the middle part of the image, one plane is established because the motion of the feature point p4 in the lower part of the image coincides with the degree of misalignment obtained from the projection conversion matrix.

In the subjects S2 and S3 in FIG. 5B, if camera motion can be correctly estimated by obtaining, in the same manner, a projection conversion matrix from an initial set composed of the feature points q1, q2, and q3 in the upper part and the middle part of the image, the motions of the feature points q4 and q5 in the lower part do not coincide with the degree of misalignment obtained with the projection conversion matrix, thus failing to establish a plane unless the moving object S4 is present. Note that if the motions of the feature points q4 and q5 in the moving object S4 coincide with the degree of misalignment obtained with the projection conversion matrix, one plane spanning the two planes on which the subjects S2 and S3 are present is erroneously established.

In order to avoid such a problem, the clustering processing unit 53 performs processing for eliminating the influence of a disturbance.

The clustering processing unit 53 includes: an evaluation score calculation unit 57 for calculating, for each of the feature points, an evaluation score serving as an index for determining a disturbance; and an abnormal region determination unit 59 for determining whether or not each of the feature points is an abnormal region due to a disturbance on the basis of the evaluation score calculated by the evaluation score calculation unit 57.

The evaluation score calculation unit 57 includes: an acceleration evaluation score calculation unit 61; and an evaluation score filter processing unit 63.

The acceleration evaluation score calculation unit 61 obtains, as an evaluation score, the difference value of the degree of misalignment between two adjacent feature points in each of the horizontal direction (X direction) and the vertical direction (Y direction) of an image. The difference values are calculated from, for example, the following expressions. By doing so, the X-direction acceleration and the Y-direction acceleration at each position (n, m) are calculated in the form of difference values. n (n=1, 2, ..., h) indicates a horizontal position in the image, and m (m=1, 2, ..., v) indicates a vertical position in the image.

$$\mathrm{dif\_Hor\_}X(n,m)=\Delta X(n+1,m)-\Delta X(n,m)$$

$$\mathrm{dif\_Hor\_}Y(n,m)=\Delta Y(n+1,m)-\Delta Y(n,m)$$

$$\mathrm{dif\_Ver\_}X(n,m)=\Delta X(n,m+1)-\Delta X(n,m)$$

$$\mathrm{dif\_Ver\_}Y(n,m)=\Delta Y(n,m+1)-\Delta Y(n,m)$$

Here, $\Delta X(n, m)$: degree of misalignment in the X direction at (n, m), $\Delta Y(n, m)$: degree of misalignment in the Y direction at (n, m), $\Delta X(n+1, m)$: degree of misalignment in the X direction at (n+1, m), $\Delta Y(n+1, m)$: degree of misalignment in the Y direction at (n+1, m), dif_Hor_X(n, m): horizontal acceleration in the X direction at (n, m), dif_Hor_Y(n, m): horizontal acceleration in the Y direction at (n, m), dif_Ver_X(n, m): vertical acceleration in the X direction at (n, m), and dif_Ver_Y(n, m): vertical acceleration in the Y direction at (n, m).

This embodiment has been described by way of an example where the acceleration evaluation score calculation unit 61 obtains, as an evaluation score, the difference value of the degree of misalignment between two adjacent feature points in each of the horizontal direction (X direction) and the vertical direction (Y direction) of an image. Instead of this, the difference value of the degree of misalignment between two adjacent feature points in an oblique 45° direction of the image may be used as an evaluation score.

The evaluation score filter processing unit 63 arrays a group of the accelerations calculated by the acceleration evaluation score calculation unit 61 in a two-dimensional space defined by the horizontal position n and the vertical position m and applies a two-dimensional spatial filter to the group of accelerations in the two-dimensional space. The accelerations calculated by the acceleration evaluation score calculation unit 61 ideally change linearly in regions other than a disturbance region. The fact is, however, that the accelerations also suffer relatively small peaks due to the influence of noise also in regions other than a disturbance region. The evaluation score filter processing unit 63 suppresses such a fluctuation in acceleration brought about by an error in the degree of misalignment and performs processing for further enhancing a sharp change in acceleration caused by a disturbance.

More specifically, the evaluation score filter processing unit 63 applies an edge enhancement filter and a noise reduction filter, such as a low pass filter, to the group of accelerations. Alternatively, the evaluation score filter processing unit 63 may apply, to the group of accelerations, an edge-retaining smoothing filter, such as a bilateral filter, for suppressing noise by performing smoothing while retaining edges. By doing so, a change in acceleration can be determined more accurately. It should be noted, however, that either of an edge enhancement filter and a noise reduction filter may be used independently in consideration of the number of arithmetic operations etc.

The abnormal region determination unit 59 includes a statistic calculation unit 65 and a region determination unit 67.

The statistic calculation unit 65 performs statistical processing of the group of accelerations that have been subjected to filtering by the evaluation score filter processing unit 63, thereby generating a statistic that serves as an index for determining whether or not each position in the horizontal direction and each position in the vertical direction correspond to a boundary of an abnormal region.

More specifically, the statistic calculation unit 65 calculates statistics Sta_H(n) and Sta_V(m) from the following expressions by using the accelerations dif_Hor_X(n, m), dif_Hor_Y(n, m), dif_Ver_X(n, m), and dif_Ver_Y(n, m) that have been subjected to filtering.

$$Sta\_H(n) = \max(dif\_Hor\_X(n,0) + dif\_Hor\_Y(n,0), dif\_Hor\_X(n,1) + dif\_Hor\_Y(n,1), \ldots, dif\_Hor\_X(n,k) + dif\_Hor\_Y(n,v))$$

$$Sta\_V(m) = \max(dif\_Ver\_X(0,m) + dif\_Ver\_Y(0,m), dif\_Ver\_X(1,m) + dif\_Ver\_Y(1,m), \ldots, dif\_Ver\_X(h,m) + dif\_Ver\_Y(h,m))$$

Here,
Sta_H(n): statistic at the horizontal position n,
Sta_V(m): statistic at the vertical position m,
h: maximum number of horizontal positions, and
v: maximum number of vertical positions.

In the above-described example, the statistic Sta_H(n) is the maximum value of the sums of the X-direction accelerations and the Y-direction accelerations at the same horizontal position, and the statistic Sta_V(m) is the maximum value of the sums of the X-direction accelerations and the Y-direction accelerations at the same vertical position. The type of statistic calculated by the statistic calculation unit 65 is not limited to that described above but may be other types of statistics. For example, the type of statistic may be a mean value, an integrated value, a median value, or a minimum value. Alternatively, a combination of a plurality of types of statistics may be used.

The region determination unit 67 determines a boundary of an abnormal region on the basis of the statistics Sta_H(n) and Sta_V(m) calculated by the statistic calculation unit 65.

Figure 6A:
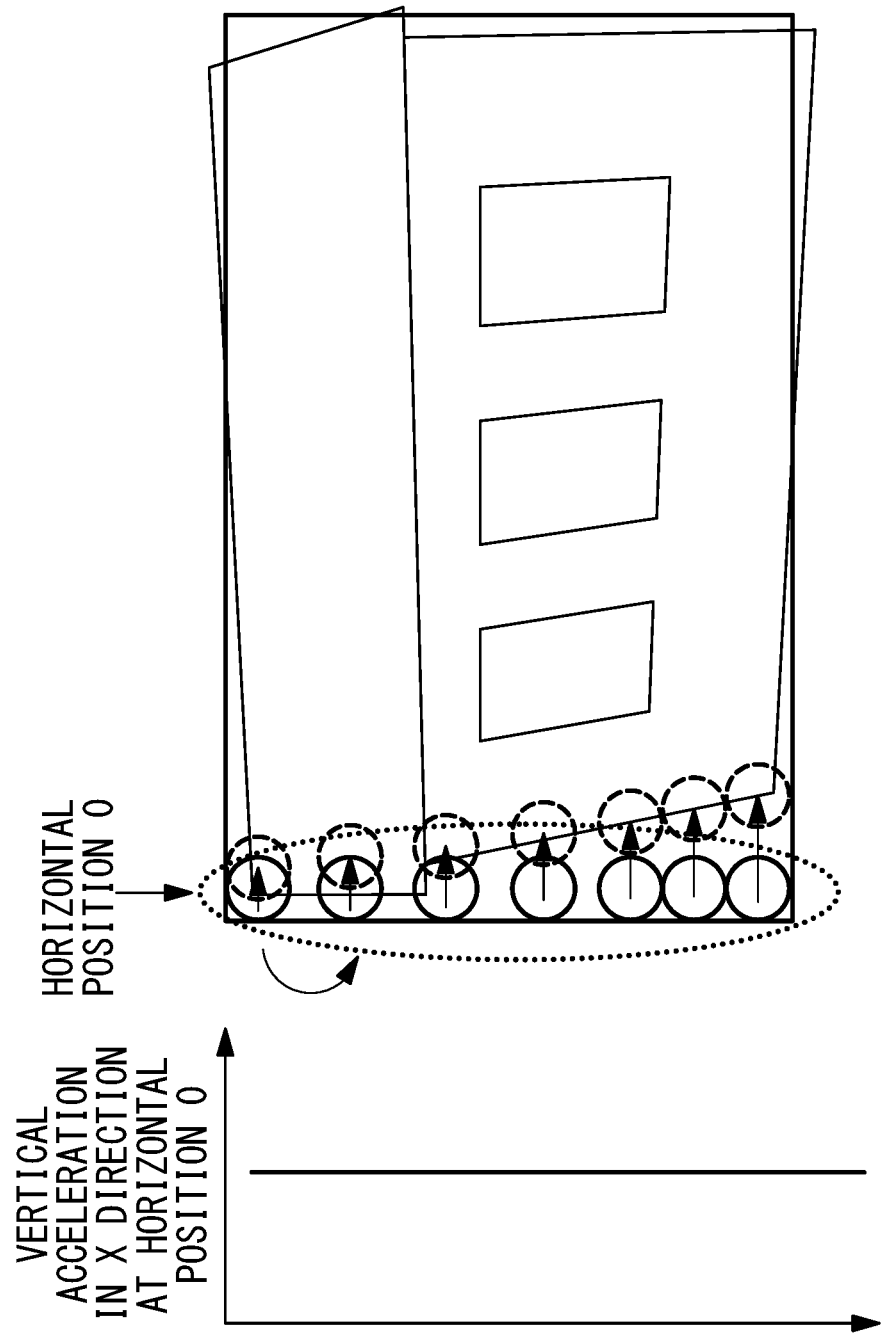
FIG. 6A is a diagram for illustrating a statistic in the vertical direction calculated from the image in FIG. 4B.

FIG. 6A shows a statistic in the vertical direction in the subject S1 in FIG. 4B. The degrees of misalignment of feature positions (refer to the circle marks) increase from the upper part to the lower part of the image at a substantially constant acceleration, and hence, the accelerations indicate a substantially constant value. When there are no sharp changes in acceleration as described above, the region determination unit 67 determines that there are no abnormal regions and classifies all feature points into the same set.

On the other hand, FIG. 7A shows a statistic in the vertical direction in the subjects S2, S3, and S4 in FIG. 5B. As shown in FIG. 7A, the acceleration is zero in the same plane, and the acceleration indicates a value other than zero at a boundary between two planes and at a position where the moving object S4 is present. In particular, the change in acceleration can be sharp at a position of the moving object S4, serving as a disturbance. In the case where a sharp change in acceleration occurs in this manner, the region determination unit 67 determines that there is an abnormal region. Then, the region determination unit 67 classifies the feature points corresponding to the abnormal region into one set and classifies the feature points corresponding to a non-abnormal region, defined as a region other than the abnormal region, into another set.

Information about the results of feature point analysis performed by the region determination unit 67 is input from the region determination unit 67 to the multi-plane projection conversion matrix calculation unit 55.

Figure 6B:
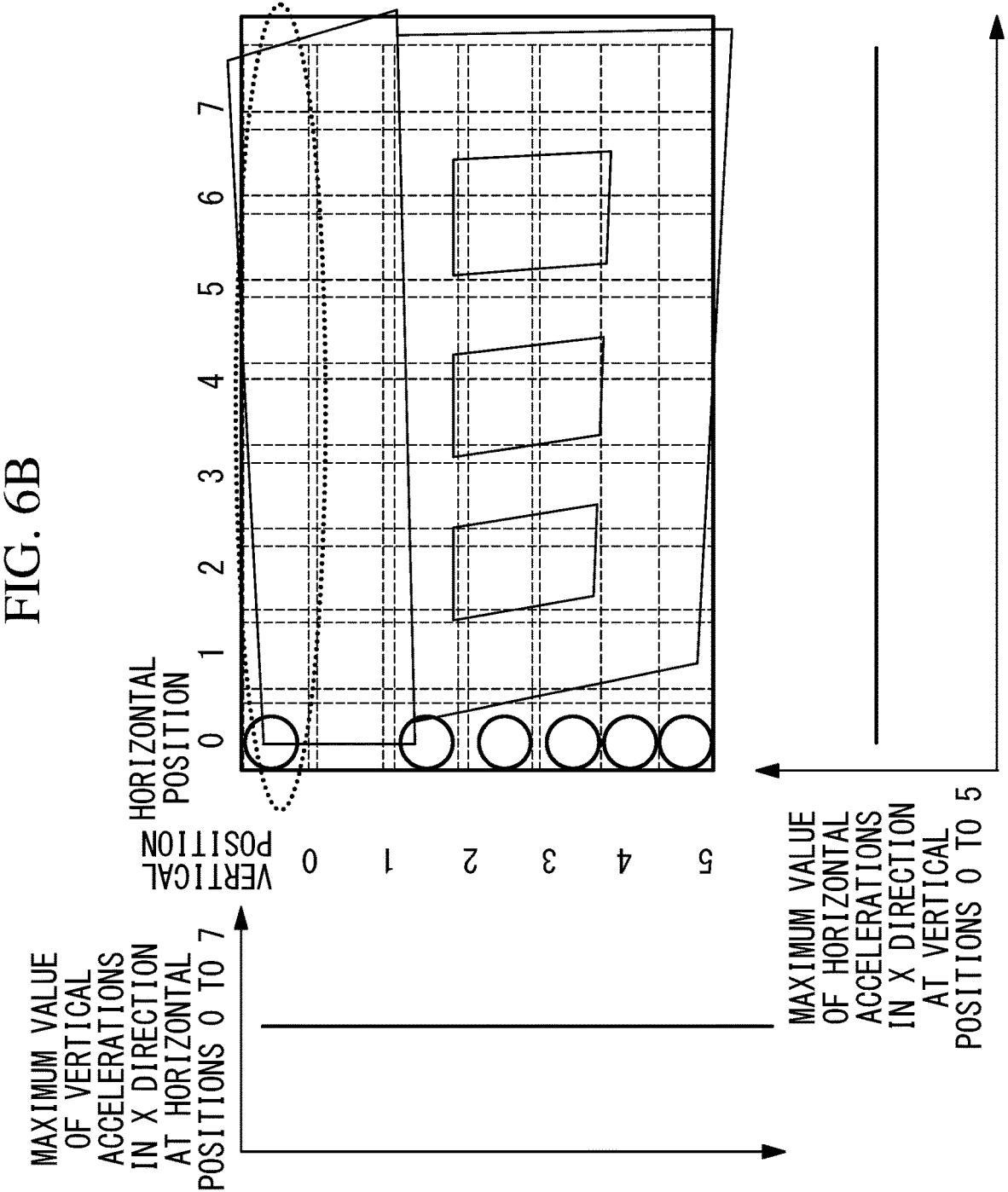
FIG. 6B is a diagram for illustrating processing for determining an abnormal region on the basis of statistics in the vertical direction and horizontal direction from the image in FIG. 4B.
Figure 7B:
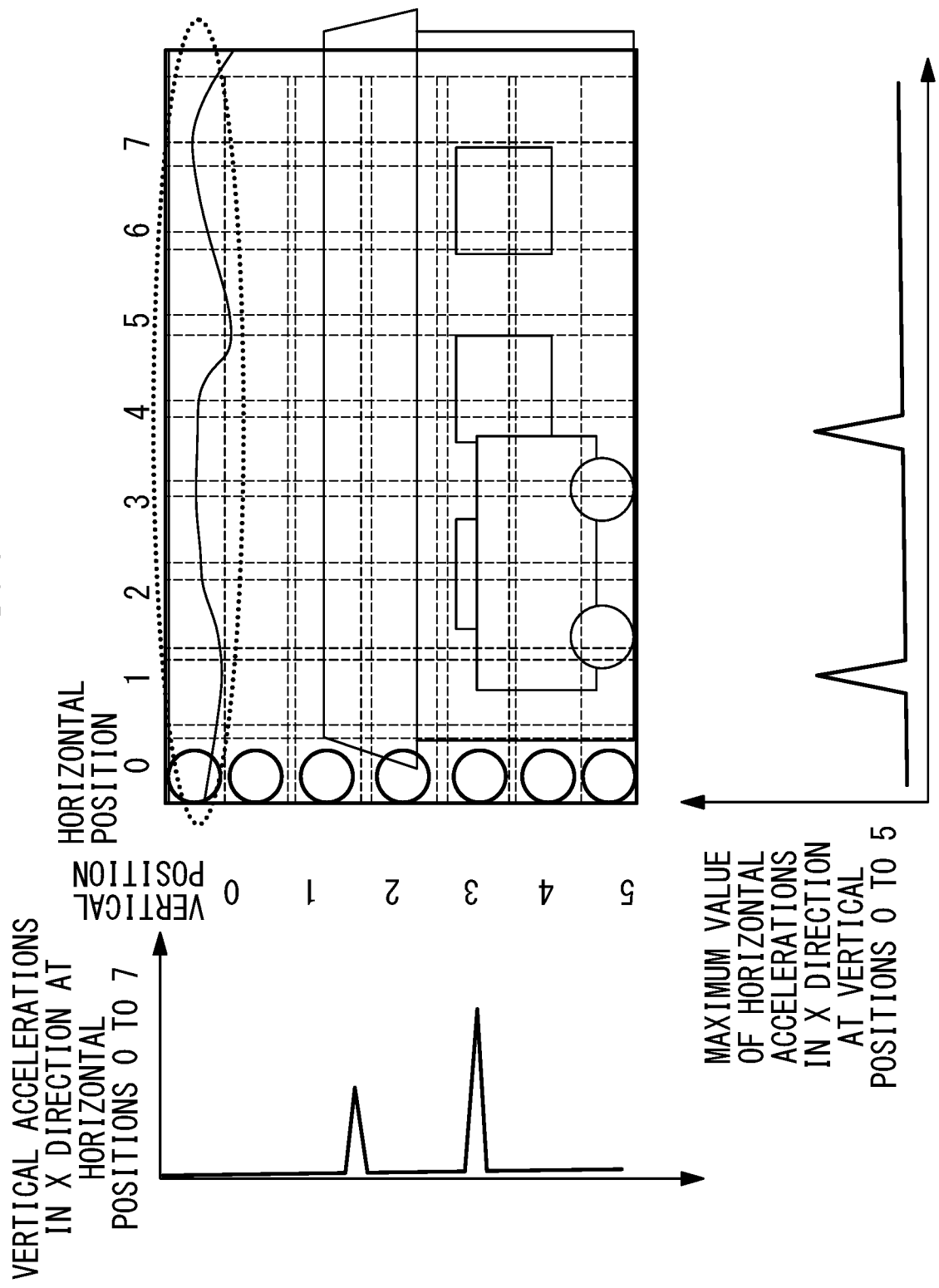
FIG. 7B is a diagram for illustrating processing for determining an abnormal region on the basis of statistics in the vertical direction and horizontal direction from the image in FIG. 5B.

FIGS. 6B and 7B are drawings for illustrating a method for determining an abnormal region.

In order to calculate a statistic at the vertical position m, the vertical-direction accelerations dif_Ver_X(n, m) and dif_Ver_Y(n, m) are first calculated for all horizontal positions n=1, 2, . . . , h. Then, of the calculated accelerations, the maximum acceleration is determined to be the statistic at the vertical position m. By performing this processing for each of the vertical positions m=1, 2, . . . , v, a statistic at each of the vertical positions can be calculated.

As a result of such calculations, because there are no sharp vertical-direction accelerations at any horizontal position in the example in FIG. 6B, no abnormal regions are present.

On the other hand, in the example in FIG. 7B, the largest acceleration is detected in a region in the lower part of the image, i.e., the region in which the moving object S4 is present. In this case, the vertical position at which the largest acceleration is detected is determined to be a boundary at which a region is switched to another, and the region from the boundary to the maximum vertical position v is determined to be an abnormal region.

By performing similar processing also in the horizontal direction, the horizontal and vertical ranges of the abnormal region are determined.

Note that although only the largest statistic is determined to be an abnormal region in the above description, the method for determining an abnormal region is not limited to this. For example, the region determination unit 67 may determine that a horizontal position and a vertical position having a statistic that is equal to or larger than a predetermined threshold value is a boundary between an abnormal region and a non-abnormal region. Alternatively, the region determination unit 67 may calculate the difference between the statistics at two horizontal positions adjacent to each other, as well as the difference between the statistics at two vertical positions adjacent to each other, and may determine that each of the region between two horizontal positions and the region between two vertical positions is a boundary between an abnormal region and a non-abnormal region if the calculated difference between the statistics for those regions is equal to or larger than a predetermined threshold value. In this manner, the boundary between an abnormal region and a non-abnormal region can also be accurately determined on the basis of the magnitude of the statistic and the difference between the statistics at two adjacent positions. In addition, when a plurality of statistics equal to or larger than a predetermined threshold value are detected, a plurality of abnormal regions may be set.

The multi-plane projection conversion matrix calculation unit 55 calculates a projection conversion matrix for each of the planes on which the degrees of misalignment in the reference image are different from one another. More specifically, the multi-plane projection conversion matrix calculation unit 55 generates at least one initial set by classifying, into the same set, feature points assumed to belong to the same plane. At this time, on the basis of the result of classification of feature points input from the clustering processing unit 53, the multi-plane projection conversion matrix calculation unit 55 produces initial sets composed of the other feature points that have remained as a result of the feature points in the abnormal region being excluded. Next, the multi-plane projection conversion matrix calculation unit 55 obtains a projection conversion matrix by using information about the feature points in each of the initial sets. Therefore, if a plurality of planes having different degrees of misalignment are present in the reference image, a plurality of projection conversion matrices in which the respective degrees of misalignment are modelled are calculated.

Here, as shown in FIG. 8A, subjects having two respective planes P1 and P2 located at depths different from each other are assumed. A far-side subject (tree) T1 is larger than a near-side subject (human) T2 in the real world. However, because the far-side subject T1 has a longer object distance than the near-side subject T2, the far-side subject T1 becomes smaller in an acquired projection image. For this reason, even though the far-side subject T1 is much larger in size than the near-side subject T2 in the real world, the far-side subject T1 and the near-side subject T2 can appear the same size in the projection image.

In this situation, if the camera is subjected to rectilinear motion, for example, as shown in FIG. 8B, the near-side subject T2 with a short object distance moves by a large distance in the projection image while the far-side subject T1 with a long object distance moves by a short distance. For this reason, the degree of misalignment differs according to the image region of each of the subjects T1 and T2 with different object distances. Because there are a plurality of degrees of misalignment in the image in this manner, a plurality of projection conversion matrices are required in order to correctly align the subjects T1 and T2.

The multi-plane projection conversion matrix calculation unit 55 calculates a plurality of projection conversion matrices for respective planes and then calculates the degree of alignment for each pixel position. For example, the multi-plane projection conversion matrix calculation unit 55 calculate reference-image coordinates on the base image.

It is assumed that: a coordinate position on the reference image is denoted as x, y; a coordinate position to be calculated on the base image is denoted as x', y'; and the result of selecting the plane of the pixel position x, y is denoted as P(x, y).

In the case where P(x, y) is a plane A, the coordinate position x', y' on the base image is obtained from expression (1) below.

$$\begin{pmatrix} x' \\ y' \\ 1 \end{pmatrix} = \begin{pmatrix} H1 & H2 & H3 \\ H4 & H5 & H8 \\ H7 & H6 & 1 \end{pmatrix} \begin{pmatrix} x \\ y \\ 1 \end{pmatrix} \quad (1)$$

$$\text{HERE, } \begin{pmatrix} H1 & H2 & H3 \\ H4 & H5 & H8 \\ H7 & H6 & 1 \end{pmatrix} : \text{PROJECTION CONVERSION MATRIX OF PLANE A}$$

In the case where P(x, y) is a plane B, the coordinate position x', y' on the base image is obtained from expression (2) below.

$$\begin{pmatrix} x' \\ y' \\ 1 \end{pmatrix} = \begin{pmatrix} G1 & G2 & G3 \\ G4 & G5 & G8 \\ G7 & G6 & 1 \end{pmatrix} \begin{pmatrix} x \\ y \\ 1 \end{pmatrix} \quad (2)$$

$$\text{HERE, } \begin{pmatrix} G1 & G2 & G3 \\ G4 & G5 & G8 \\ G7 & G6 & 1 \end{pmatrix} : \text{PROJECTION CONVERSION MATRIX OF PLANE B}$$

When a coordinate position on the reference image is to be aligned with a coordinate position on the base image, the multi-plane projection conversion matrix calculation unit 55 calculates the degrees of alignment dif_x and dif_y from expressions (3) and (4) below.

$$\text{dif\_}x = x - x' \quad (3)$$

$$\text{dif\_}y = y - y' \quad (4)$$

The plane projection conversion matrix to be applied to each pixel can be determined by the method described in, for example, PTL 1 (Publication of Japanese Patent No. 5499261). More specifically, a plurality of position-alignment images that have been geometrically converted with respective plane projection conversion matrices are generated, the difference value between the base image and each of the position-alignment images is obtained for each pixel, and the projection conversion matrix used to generate the position-alignment image with the smallest difference is finally applied. It should be noted, however, that this method is merely one example, and the projection conversion matrix to be applied to each pixel may be determined according to another method.

Referring back to FIG. 2, the image combining unit 31 applies geometric conversion to, for example, a reference image on the basis of the degrees of alignment dif_x and dif_y calculated by the alignment-degree calculation unit 29 and combines the converted reference image with the base image, thus generating a combined image.

Combining processing may be performed by, for example, a method for simply arithmetically averaging the pixel values at the same coordinate positions on a position-alignment image and the base image, and thus the method is not limited. Combining processing may also be performed for various purposes including noise reduction, HDR (High Dynamic Range), super-resolution, etc., and thus the purposes thereof are not limited.

The white balance correction processing unit 33 amplifies, with a predetermined amount of gain, each of the color components of data of the combined image generated by the image combining unit 31, thereby correcting the color balance of the combined image.

The synchronization processing unit 35 converts, into image data in which one pixel has a plurality of color components, the combined image, which has been generated by using imaging data in which one pixel has one color component corresponding to the Bayer array of the color filter of the image acquisition element 27.

The brightness characteristics conversion unit 37 converts brightness characteristics of the combined image generated by the synchronization processing unit 35 so as to be suitable for display and recording.

The edge enhancement processing unit 39 multiplies, by an edge enhancement factor, an edge signal extracted by using a band-pass filter etc. from the output data (image data) of the combined image, which has been input from the brightness characteristics conversion unit 37, and adds the result to the image data of the original combined image, thereby enhancing the edge (outline) component in the image data of the target combined image.

The noise reduction processing unit 41 removes, by using coring processing etc., noise components in the output data (image data) of the combined image that has been input from the edge enhancement processing unit 39.

The color reproduction processing unit 43 performs various types of processing for achieving appropriate color reproduction of the combined image. Processing performed by the color reproduction processing unit 43 includes, for example, a color matrix arithmetic operation. In the color matrix arithmetic operation, data of the combined image is multiplied by, for example, a color matrix factor according to the white balance mode. In addition to this, the color reproduction processing unit 43 performs, for example, processing for correcting color saturation/hue.

Next, the operation of the image acquisition system 100 and the image processing method including the image processing unit 9 with the above-described configuration will be described.

Figure 9:
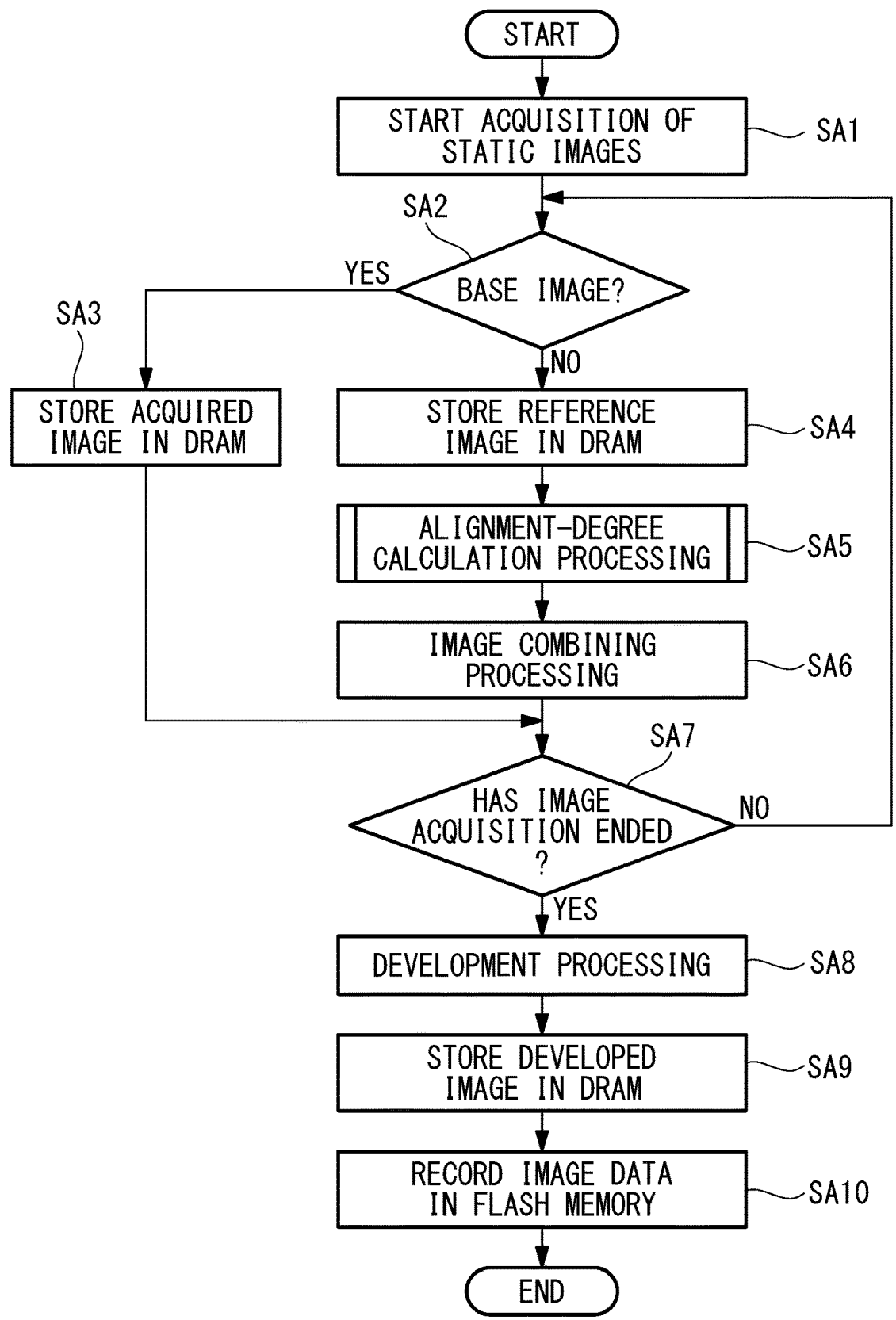
FIG. 9 is a flowchart for illustrating an image processing method according to one embodiment of the present invention.

The flowchart in FIG. 9 shows one example of processing for recording static images performed by the image acquisition system 100 according to this embodiment. Static image recording starts when, for example, the operating section 17, serving as the release button, is pressed during live view display. Although processing for recording static images will be described here, similar processing is also performed for the operation of dynamic image recording. Note that the processing described with reference to FIG. 9 is controlled by the CPU 15 and is executed by the ASIC of the image processing unit 9. Programs related to this processing can also be recorded in various types of recording media, such as an optical disk, a magnetic disk, and a semiconductor memory.

First, as shown in the flowchart in FIG. 9, image acquisition for static image recording is started through the operation of the CPU 15 (step SA1), and it is determined whether or not the current image acquisition is for the base image (step SA2). The determination as to whether or not the current image acquisition is for the base image can be made depending on whether or not the current image acquisition is for, for example, the first static image among the time-sequentially acquired successive static images.

If the current image acquisition is for the base image, the acquired image is written as the base image into the DRAM 7 via the bus 71 (step SA3), and the flow proceeds to the next image acquisition. The base image written into the DRAM 7 is stored in the DRAM 7 until successive image acquisition ends.

If the current image acquisition is not for the base image, the acquired image is stored as a reference image in the DRAM 7 via the bus 71 (step SA4).

Next, the base image and the reference image stored in the DRAM 7 are read out by the image processing unit 9, and degrees of alignment dif_x and dif_y are calculated by the alignment-degree calculation unit 29 (step SA5). Details of alignment-degree calculation processing in step SA5 will be described later.

Next, the image combining unit 31 applies geometric conversion to the reference image on the basis of the degrees of alignment dif_x and dif_y calculated by the alignment-degree calculation unit 29 and combines the converted reference image with the base image, thus generating a combined image (step SA6).

Subsequently, the CPU 15 determines whether or not the successive image acquisition has ended (step SA7). More specifically, the CPU 15 determines whether or not an instruction for ending successive image acquisition has been input. An instruction for ending image acquisition is input, for example, when the release button, serving as the operating section 17, is pressed again while a still image is being acquired. If no instructions for ending successive image acquisition are input, the flow returns to step SA2 to acquire the next reference image. On the other hand, if an instruction for ending image acquisition has been input, the flow proceeds to step SA8.

Next, the white balance correction processing unit 33, the synchronization processing unit 35, the brightness characteristics conversion unit 37, the edge enhancement processing unit 39, the noise reduction processing unit 41, and the color reproduction processing unit 43 in the image processing unit 9 perform development processing of the combined image (step SA8).

The combined image that has been subjected to development processing in the image processing unit 9 is written into the DRAM 7 via the bus 71 (step SA9).

The recording combined image written into the DRAM 7 is recorded by the CPU 15 in the FLASH memory 19 (step SA10). Thereafter, processing ends.

Figure 10:
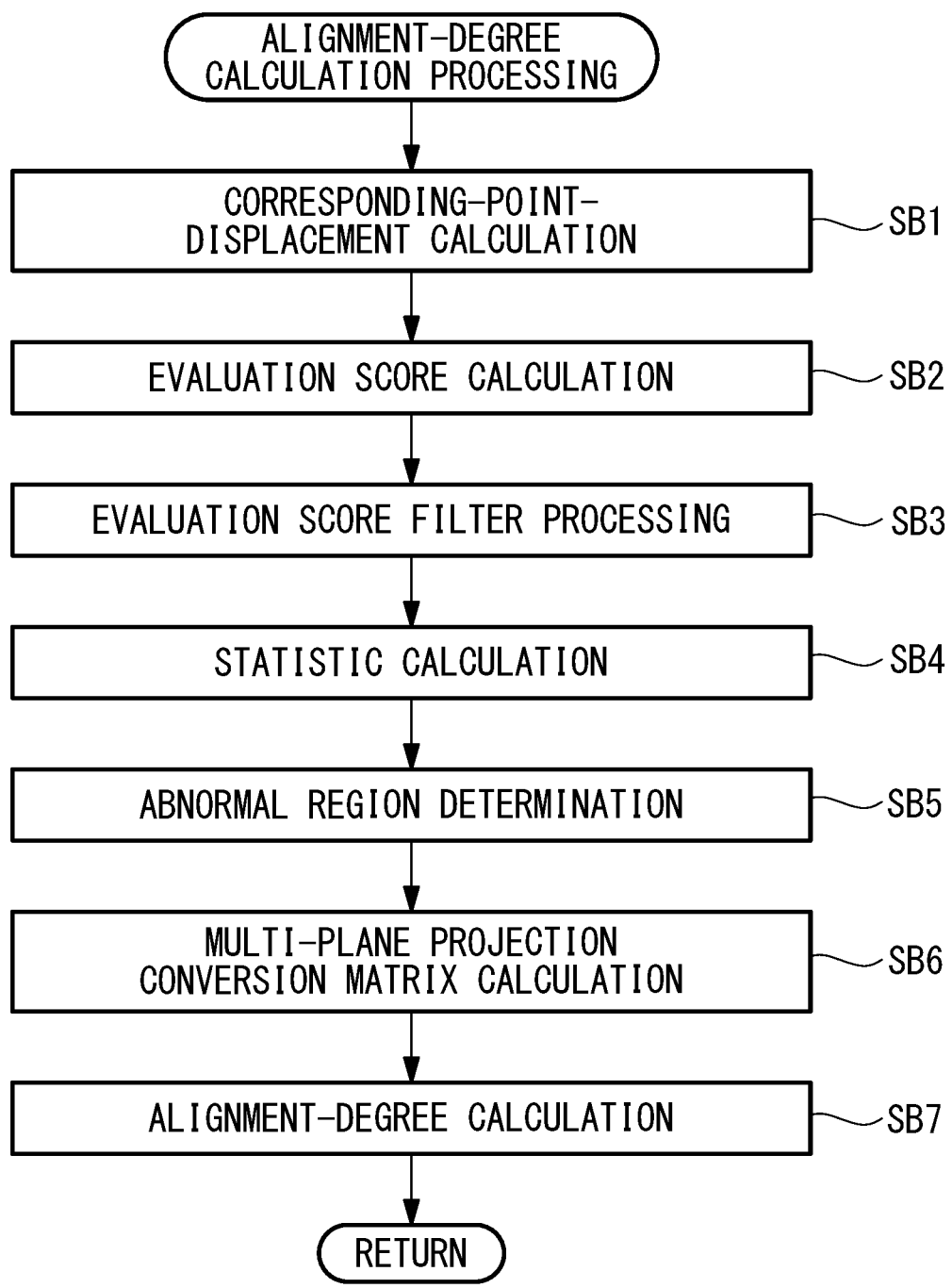
FIG. 10 is a flowchart for illustrating alignment-degree calculation processing in FIG. 9.

Next, details of the alignment-degree calculation processing in step SA5 will be described with reference to the flowchart in FIG. 10.

In alignment-degree calculation processing, first, the corresponding-point-displacement calculation unit 51 calculates the degrees of misalignment of corresponding points (corresponding feature points) between the base image and the reference image by using a known method, such as the optical flow (step SB1).

Next, in the evaluation score calculation unit 57 of the clustering processing unit 53, the acceleration evaluation score calculation unit 61 calculates, from the degrees of misalignment calculated in step SB1, the acceleration between two adjacent feature points as an evaluation score (step SB2).

Next, the evaluation score filter processing unit 63 of the evaluation score calculation unit 57 applies a two-dimensional spatial filter to a group of the accelerations calculated in step SB2 (step SB3). This suppresses fluctuations in acceleration caused by an error in the calculation of the degrees of misalignment in step SB1 and also enhances a sharp change in acceleration.

Next, the statistic calculation unit 65 of the abnormal region determination unit 59 performs statistical processing of the group of accelerations and calculates a statistic of the accelerations for each of the horizontal positions and for each of the vertical positions of the reference image (step SB4).

Next, the region determination unit 67 of the abnormal region determination unit 59 determines an abnormal region in the reference image on the basis of the statistics calculated in step SB4 and classifies the feature points on the basis of the determination (step SB5).

More specifically, in the region determination unit 67, the horizontal position having the largest statistic of the accelerations is determined to be the boundary between an abnormal region and a non-abnormal region, and the vertical position having the largest statistic of the accelerations is determined to be the boundary between an abnormal region and a non-abnormal region, thus determining an abnormal region.

Subsequently, the region determination unit 67 classifies, into one of two sets, each of the plurality of feature points extracted by the optical flow, feature point matching, or the like in step SB1 depending on whether the feature point is a feature point contained in the abnormal region or is a feature point contained in a region other than the abnormal region (non-abnormal region). By doing so, the set composed of only feature points in the abnormal region and the set composed of only feature points in the non-abnormal region are produced.

Next, the multi-plane projection conversion matrix calculation unit 55 produces, from the feature points belonging to the set for the non-abnormal region classified in step SB5, at least one initial set composed of three or more feature points assumed to be located on the same plane and calculates a projection conversion matrix from the feature points contained in the initial set (step SB6). By doing so, the initial set, from which the feature points in the abnormal region are excluded, is produced. The projection conversion matrix calculated from such an initial set becomes a proper projection conversion matrix free from the influence of a disturbance like the moving object S4.

Subsequently, the multi-plane projection conversion matrix calculation unit 55 calculates the degrees of alignment dif_x and dif_y of each pixel in the reference image by using the projection conversion matrix (step SB7).

Then, in the image combining unit 31, the generation of the combined image in step SA6 is performed on the basis of the calculated degrees of alignment dif_x and dif_y.

The accelerations of the movements of the subjects S2 and S3 between images due to a camera motion become substantially constant in the image, whereas the acceleration abruptly changes in a region in which a disturbance like the moving object S4 is present. Therefore, a difference in acceleration arises between a feature point extracted from the region of the moving object S4 and a feature point extracted from regions other than the region of the moving object S4.

According to the image acquisition system 100 and the image processing method including the image processing unit 9 according to this embodiment, when feature points are extracted from an abnormal region serving as a disturbance, the feature points in the abnormal region are detected on the basis of a sharp change in acceleration of the feature points. Then, an initial set composed of the other feature points that have remained as a result of the feature points in the abnormal region being excluded is produced. By using such an initial set, a projection conversion matrix can be obtained correctly without suffering the influence of the disturbance. This makes it possible to generate a combined image in which an artifact due to misalignment is suppressed even in the case of the subjects S2, S3, and S4 that have depths and in which a plurality of planes coexist.

Although this embodiment is configured so that the image processing method is realized by means of hardware, the image processing method may be realized by means of computer-executable image processing programs.

Although one embodiment of the present invention has been described in detail with reference to the drawings, the specific structures are not limited to those of this embodiment but include design changes etc. that do not depart from the spirit of the present invention. For example, this embodiment has been described by way of an example of the image acquisition system 100 serving as a digital camera. However, the image acquisition system 100 is not limited to a digital camera; the above-described technique is applicable, as long as a plurality of pieces imaging data in which a base image and a reference image are present are available.

The above-described embodiment also leads to the following invention.

A first aspect of the present invention is an image processing device for generating a combined image by combining one base image and at least one reference image other than the base image that have been acquired time-sequentially, and the image processing device includes: an alignment-degree calculation unit for calculating the degree of alignment of each pixel of the reference image with respect to each pixel of the base image by using at least one projection conversion matrix; and an image combining unit for generating the combined image by converting the reference image on the basis of the degrees of alignment calculated by the alignment-degree calculation unit and by combining the converted reference image with the base image, wherein the alignment-degree calculation unit has a corresponding-region-displacement calculation unit for calculating a displacement of each of a plurality of corresponding feature regions between the reference image and the base image, a clustering processing unit for classifying, as at least one set, other feature regions excluding, from the plurality of feature regions, an abnormal feature region having the displacement that shows a different tendency from the displacement of the other feature regions, and a projection conversion matrix calculation unit for calculating the at least one projection conversion matrix by using the displacement of the other feature regions and the result of classification performed by the clustering processing unit, wherein the clustering processing unit has an evaluation score calculation unit for calculating an evaluation score of each of the plurality of feature regions by using the displacement calculated by the corresponding-region-displacement calculation unit and an abnormal region determination unit for determining the abnormal region on the basis of the evaluation score calculated by the evaluation score calculation unit, and wherein the evaluation score calculation unit has an acceleration evaluation score calculation unit for calculating, as the evaluation score, the difference value between the displacements of two feature regions adjacent to each other in at least one of the up/down direction, the left/right direction, and the oblique 45° direction.

According to the above-described first aspect, the alignment-degree calculation unit calculates, by using the projection conversion matrix, the degree of alignment for aligning each of the pixels of the reference image with each of the pixels of the base image, and the image combining unit combines the reference image converted on the basis of the degrees of alignment with the base image. By doing so, a combined image free from misalignment of a subject is generated.

In this case, in the alignment-degree calculation unit, displacements of corresponding feature regions between the reference image and the base image are calculated by the corresponding-region-displacement calculation unit. The displacements of the feature regions caused by a motion of the image acquisition device for acquiring the base image and the reference image show tendencies substantially identical to one another. In contrast, the displacements of feature regions caused by a disturbance such as a moving object show different tendencies from the displacements of the other feature regions.

In the clustering processing unit, a feature region in which such a disturbance is occurring is preliminarily excluded as an abnormal region, thus producing a set composed of the feature regions other than the abnormal region. By using a set composed of such feature regions, the projection conversion matrix calculation unit can obtain a projection conversion matrix correctly. This makes it possible to generate a combined image in which an artifact due to misalignment is suppressed even in the case of subjects that have depths and in which a plurality of planes coexist.

In addition, by using evaluation scores based on displacements, the abnormal region can be easily determined.

In addition, the difference value between displacements calculated by the acceleration evaluation score calculation unit represents a change in moving speed, i.e., an acceleration, between two adjacent feature regions. By using such an acceleration as the evaluation score, the abnormal region can be detected with high accuracy.

In the above-described first aspect, the evaluation score calculation unit may have an evaluation score filter processing unit for applying filter processing to the calculated evaluation score. It is preferable that filter processing applied by the evaluation score filter processing unit be edge enhancement filter processing or edge-retaining smoothing filter processing, in which an edge enhancement filter and a noise reduction filter are combined.

By doing so, changes in evaluation scores based on a disturbance are emphasized, compared with changes in evaluation scores based on a factor other than the disturbance. Therefore, the abnormal region can be determined more correctly on the basis of the evaluation scores subjected to filter processing.

In the above-described first aspect, the abnormal region determination unit may have a statistic calculation unit for calculating a statistic of the evaluation scores calculated by the evaluation score calculation unit and a region determination unit for determining the abnormal region on the basis of the statistic calculated by the statistic calculation unit.

By doing so, the abnormal region can be determined even more correctly on the basis of the statistics calculated from the evaluation scores.

In the above-described first aspect, the statistic calculation unit may calculate, as the statistic for each horizontal position and each vertical position in the reference image, at least one of the mean value, the median value, the integrated value, the maximum value, and the minimum value of the evaluation scores calculated by the evaluation score calculation unit.

By doing so, the horizontal position and the vertical position of the abnormal region in the reference image can be determined on the basis of statistics.

In the above-described first aspect, the region determination unit may determine that a horizontal position and a vertical position in the reference image, the horizontal position and vertical position having the statistic that is equal to or larger than a predetermined threshold value, are a boundary between the abnormal region and a non-abnormal region other than the abnormal region. Alternatively, the region determination unit may calculate the difference between the statistics of two horizontal positions adjacent to each other and the difference between the statistics of two vertical positions adjacent to each other and may determine that a region between the two horizontal positions and a region between the two vertical positions in which the calculated differences between the statistics are equal to or larger than a predetermined threshold value is a boundary between the abnormal region and a non-abnormal region serving as the other feature region.

The statistic sharply changes between the abnormal region and the non-abnormal region. Therefore, the boundary between the abnormal region and the non-abnormal region can be accurately determined on the basis of the magnitude of a statistic or the difference of statistic between two adjacent positions.

A second aspect of the present invention is an image processing method for generating a combined image by combining one base image and at least one reference image other than the base image that have been acquired time-sequentially, and the image processing method includes: an alignment-degree calculation step for calculating the degree of alignment of each pixel of the reference image with respect to each pixel of the base image by using at least one projection conversion matrix; and an image combining step for generating the combined image by converting the reference image on the basis of the degrees of alignment calculated in the alignment-degree calculation step and by combining the converted reference image with the base image, wherein the alignment-degree calculation step includes a corresponding-region-displacement calculation step for calculating a displacement of each of a plurality of corresponding feature regions between the reference image and the base image, a clustering processing step for classifying, as at least one set, other feature regions excluding, from the plurality of feature regions, an abnormal feature region having the displacement that shows a different tendency from the displacement of the other feature regions, and a projection conversion matrix calculation step for calculating the at least one projection conversion matrix by using the displacement of the other feature regions and the result of classification executed in the clustering processing step.

A third aspect of the present invention is an image processing program for causing a computer to execute processing for generating a combined image by combining one base image and at least one reference image other than the base image that have been acquired time-sequentially, and the program causes the computer to execute: an alignment-degree calculation step for calculating the degree of alignment of each pixel of the reference image with respect to each pixel of the base image by using at least one projection conversion matrix; and an image combining step for generating the combined image by converting the reference image on the basis of the degrees of alignment calculated in the alignment-degree calculation step and by combining the converted reference image with the base image, wherein the alignment-degree calculation step includes a corresponding-region-displacement calculation step for calculating a displacement of each of a plurality of corresponding feature regions between the reference image and the base image, a clustering processing step for classifying, as at least one set, other feature regions excluding, from the plurality of feature regions, an abnormal feature region having the displacement that shows a different tendency from the displacement of the other feature regions, and a projection conversion matrix calculation step for calculating the at least one projection conversion matrix by using the displacement of the other feature regions and the result of classification executed in the clustering processing step.

REFERENCE SIGNS LIST

9 Image processing unit (image processing device)
29 Alignment-degree calculation unit
31 Image combining unit
51 Corresponding-point-displacement calculation unit (corresponding-region-displacement calculation unit)
53 Clustering processing unit
55 Multi-plane projection conversion matrix calculation unit (projection conversion matrix calculation unit)
57 Evaluation score calculation unit
59 Abnormal region determination unit
61 Acceleration evaluation score calculation unit
63 Evaluation score filter processing unit
65 Statistic calculation unit
67 Region determination unit
100 Image acquisition system
SA5 Alignment-degree calculation step
SA6 Image combining step
SB1 Corresponding-region-displacement calculation step
SB2, SB3, SB4, SB5 Clustering processing step
SB6 Multi-plane projection conversion matrix calculation step

The invention claimed is:

1. An image processing device for generating a combined image by combining one base image and at least one reference image other than the base image that have been acquired time-sequentially, comprising:
 circuitry configured to:
  calculate a degree of alignment of each pixel of the reference image with respect to a corresponding pixel of the base image by using at least one projection conversion matrix; and
  generate the combined image by converting the reference image based on the calculated degree of alignment and by combining the converted reference image with the base image,
 wherein in the calculating of the degree of alignment, the circuitry is configured to:
  calculate a displacement of each of a plurality of corresponding feature regions between the reference image and the base image;
  classify, as at least one set, other feature regions excluding, from the plurality of feature regions, an abnormal feature region having the displacement that shows a different tendency from the displacement of the other feature regions; and
  calculate the at least one projection conversion matrix by using the displacement of the other feature regions and a result of the classifying the other feature regions,
 wherein in the classifying the other feature regions, the circuitry is configured to:

calculate an evaluation score of each of the plurality of feature regions by using the calculated displacement; and
  determine the abnormal region based on the calculated evaluation score, and
 wherein in the calculating the evaluation score, the circuitry is configured to:
  calculate, as the evaluation score, a difference value between the displacements of two feature regions adjacent to each other in at least one of an up/down direction, a left/right direction, and an oblique 45° direction; and
  apply filter processing to the calculated evaluation score.

2. The image processing device according to claim 1, wherein in the applying the filter processing, the circuitry is configured to apply edge enhancement filter processing or edge-retaining smoothing filter processing in which an edge enhancement filter and a noise reduction filter are combined.

3. The image processing device according to claim 1,
 wherein in the determining the abnormal region, the circuitry is configured to:
  calculate a statistic of the calculated evaluation scores; and
  determine the abnormal region based on the calculated statistic.

4. The image processing device according to claim 3, wherein in the calculating the statistic, the circuitry is configured to calculate, as the statistic for each horizontal position and each vertical position in the reference image, at least one of a mean value, a median value, an integrated value, a maximum value, and a minimum value of the calculated evaluation scores.

5. The image processing device according to claim 3, wherein in the determining the abnormal region, the circuitry is configured to determine that a horizontal position and a vertical position in the reference image, the horizontal position and vertical position having the statistic that is equal to or larger than a predetermined threshold value, are a boundary between the abnormal region and a non-abnormal region other than the abnormal region.

6. The image processing device according to claim 4, wherein in the determining the abnormal region, the circuitry is configured to calculate a difference between the statistics of two horizontal positions adjacent to each other and the difference between the statistics of two vertical positions adjacent to each other and determine that a region between the two horizontal positions and a region between the two vertical positions in which the calculated differences between the statistics are equal to or larger than a predetermined threshold value is a boundary between the abnormal region and a non-abnormal region other than the abnormal region.

7. An image processing method for generating a combined image by combining one base image and at least one reference image other than the base image that have been acquired time-sequentially, comprising:
 calculating a degree of alignment of each pixel of the reference image with respect to a corresponding pixel of the base image by using at least one projection conversion matrix; and
 generating the combined image by converting the reference image based on the calculated degrees of alignment and by combining the converted reference image with the base image, wherein in the calculating of the degree of alignment:
    calculating a displacement of each of a plurality of corresponding feature regions between the reference image and the base image;
    classifying, as at least one set, other feature regions excluding, from the plurality of feature regions, an abnormal feature region having the displacement that shows a different tendency from the displacement of the other feature regions; and
    calculating the at least one projection conversion matrix by using the displacement of the other feature regions and a result of the classifying the other feature regions,
wherein in the classifying the other feature regions:
    calculating an evaluation score of each of the plurality of feature regions by using the calculated displacement; and
    determining the abnormal region based on the calculated evaluation score, and
wherein in the calculating the evaluation score:
    calculating, as the evaluation score, a difference value between the displacements of two feature regions adjacent to each other in at least one of an up/down direction, a left/right direction, and an oblique 45° direction; and
    applying filter processing to the calculated evaluation score.

8. A non-transitory computer-readable medium having stored thereon an image processing program for causing a computer to execute processing for generating a combined image by combining one base image and at least one reference image other than the base image that have been acquired time-sequentially, the program causing the computer to execute functions of:

calculating a degree of alignment of each pixel of the reference image with respect to a corresponding pixel of the base image by using at least one projection conversion matrix; and
generating the combined image by converting the reference image based on the calculated degrees of alignment and by combining the converted reference image with the base image,
wherein in the calculating of the degree of alignment:
    calculating a displacement of each of a plurality of corresponding feature regions between the reference image and the base image;
    classifying, as at least one set, other feature regions excluding, from the plurality of feature regions, an abnormal feature region having the displacement that shows a different tendency from the displacement of the other feature regions; and
    calculating the at least one projection conversion matrix by using the displacement of the other feature regions and a result of the classifying the other feature regions,
wherein in the classifying the other feature regions:
    calculating an evaluation score of each of the plurality of feature regions by using the calculated displacement; and
    determining the abnormal region based on the calculated evaluation score, and
wherein in the calculating the evaluation score:
    calculating, as the evaluation score, a difference value between the displacements of two feature regions adjacent to each other in at least one of an up/down direction, a left/right direction, and an oblique 45° direction; and
    applying filter processing to the calculated evaluation score.

* * * * *